US011168291B2

(12) United States Patent
Park et al.

(10) Patent No.: US 11,168,291 B2
(45) Date of Patent: Nov. 9, 2021

(54) BEER MAKER

(71) Applicant: LG ELECTRONICS INC., Seoul (KR)

(72) Inventors: Sunyoung Park, Seoul (KR); Heeyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 630 days.

(21) Appl. No.: 15/651,881

(22) Filed: Jul. 17, 2017

(65) Prior Publication Data

US 2018/0016531 A1 Jan. 18, 2018

Related U.S. Application Data

(60) Provisional application No. 62/363,326, filed on Jul. 17, 2016.

(30) Foreign Application Priority Data

Aug. 29, 2016 (KR) .................. 10-2016-0110347
Feb. 21, 2017 (KR) .................. 10-2017-0022966

(51) Int. Cl.
*C12C 13/10* (2006.01)
*C12C 11/00* (2006.01)
(Continued)

(52) U.S. Cl.
CPC ............... *C12C 13/10* (2013.01); *C12C 7/06* (2013.01); *C12C 7/205* (2013.01); *C12C 11/006* (2013.01); *C12C 13/08* (2013.01)

(58) Field of Classification Search
CPC .......... C12C 13/10; C12C 7/06; C12C 7/205; C12C 11/006; C12C 13/08
(Continued)

(56) References Cited

U.S. PATENT DOCUMENTS 4,070,133 A * 1/1978 McCormick ............. B67D 1/04
137/212
4,708,938 A 11/1987 Hickinbotham
(Continued)

FOREIGN PATENT DOCUMENTS

JP   H10-313848   12/1998
JP   2007-290755  11/2007
(Continued)

OTHER PUBLICATIONS

WO9913049A2 Machine Translation; Lenz, August; Mar. 18, 1999 (Year: 1999).*
(Continued)

*Primary Examiner* — Dana Ross
*Assistant Examiner* — Michael S. Poetzinger
(74) *Attorney, Agent, or Firm* — Ked & Associates, LLP

(57) ABSTRACT

A beer maker may include a fermentation vessel accommodated in a space and having a beer brewing space, a main channel communicating with the beer brewing space, a sub-channel communicating with the beer brewing space, a gas pump connected to the sub-channel to pump gas to the sub-channel, and a gas valve at the sub-channel. Ingredients for brewing beer are supplied to the beer brewing space through the main channel, and gas is supplied to the beer brewing space through the sub-channel, so that beer can be simply brewed while minimizing a user from opening the lid.

12 Claims, 16 Drawing Sheets

(51) Int. Cl.
*C12C 7/06* (2006.01)
*C12C 7/20* (2006.01)
*C12C 13/08* (2006.01)

(58) Field of Classification Search
USPC .............................................. 99/276, 323.1
See application file for complete search history.

(56) References Cited

U.S. PATENT DOCUMENTS

| | | | |
|---|---|---|---|
| 5,285,718 A | 2/1994 | Webster et al. | |
| 7,819,286 B2* | 10/2010 | Antheil | B65D 21/0231 220/495.01 |
| 8,601,936 B2* | 12/2013 | Williams | C12C 11/006 99/281 |
| 9,228,163 B1 | 1/2016 | Mitchell et al. | |
| 10,448,778 B2* | 10/2019 | Watson | A47J 27/21083 |
| 10,808,213 B2* | 10/2020 | Park | C12C 13/10 |
| 2003/0071067 A1* | 4/2003 | Sluijter | B67D 1/0462 222/183 |
| 2003/0222102 A1 | 12/2003 | Cho | |
| 2010/0018994 A1* | 1/2010 | Antheil | B65D 21/0231 222/105 |
| 2010/0129490 A1* | 5/2010 | Williams | C12C 11/006 426/11 |
| 2014/0072678 A1 | 3/2014 | Jenkins | |
| 2016/0201018 A1* | 7/2016 | Watson | A47J 27/08 426/11 |
| 2017/0267511 A1* | 9/2017 | Valles | B67D 1/0004 |
| 2019/0039875 A1* | 2/2019 | Ware | B67D 7/0288 |
| 2019/0358596 A1 | 11/2019 | Sobottka | |
| 2020/0056129 A1 | 2/2020 | Scheller | |

FOREIGN PATENT DOCUMENTS

| | | |
|---|---|---|
| JP | 2015-156815 | 9/2015 |
| KR | 20-0319526 | 6/2003 |
| KR | 10-2004-0045269 | 6/2004 |
| KR | 10-0777140 | 11/2007 |
| KR | 10-2009-0041266 | 4/2009 |
| KR | 10-1033113 | 5/2011 |
| KR | 20-2011-0011527 | 12/2011 |
| KR | 10-2016-0018206 | 2/2016 |

OTHER PUBLICATIONS

International Search Report dated Nov. 10, 2017 issued in Application No. PCT/KR2017/007196.
Korean Office Action dated Dec. 16, 2019 issued in Application 10-2016-0110346.
Korean Office Action dated Dec. 30, 2019 issued in Application 10-2016-0174216.
Korean Office Action dated Jan. 30, 2020 issued in Application 10-2017-0022966.
Extended European Search Report dated Feb. 11, 2020 issued in Application 17831252.6.
Karl F. Lutzen et al.: "The Home brewery" In: "Chemistry—A European Journal," Jan. 8, 1996, Wiley—V C H Verlag GmbH & Co. KGaA, DE XP055664965, ISSN: 0947-6539, vol. 19, pp. 6-16.
U.S. Appl. No. 15/651,831, filed Jul. 17, 2017.
United States Office Action dated Mar. 23, 2020 issued in co-pending related U.S. Appl. No. 15/651,831.

* cited by examiner

BEER MAKER

CROSS-REFERENCE TO RELATED APPLICATIONS

This application claims the benefit of an earlier filing date and right of priority under 35 U.S.C. 119 to U.S. Provisional Application No. 62/363,326 filed on Jul. 17, 2016 and Korean Patent Application No. 10-2016-0110347, filed Aug. 29, 2016, and Korean Patent Application No. 10-2016-0022966, filed Feb. 21, 2017 in the Korean Intellectual Property Office, the subject matters of which are incorporated herein by reference.

BACKGROUND

1. Field

The present disclosure relates to a beer maker.

2. Background

Beer is an alcoholic beverage brewed by filtering wort made with malt made from germinated barley, adding hops to the wort, and then fermenting the wort with yeast.

Customers may purchase ready-made articles brewed and sold by beer brewers, or house beers (or handmade beers) may be brewed by directly fermenting ingredients of the beers in households or bars.

Various kinds of house beers may be brewed as compared with ready-made articles. The house beers may be brewed suitable for customers' tastes.

Ingredients for brewing beer may include water, malt, hops, yeast, flavor additives, and/or the like.

The yeast may be called as leaven, and may be added to malt to ferment the malt. The yeast may assist alcohol and carbonic acid to be generated.

The flavor additives may be additives that improve the taste of beer, such as fruit, syrup, and vanilla beans, for example.

House beer may include a total of three steps or operations (i.e., a wort producing step, a fermenting step, and a ripening step). Two weeks to three weeks may be required from the wort producing step to the ripening step.

In the house beer, an optimum temperature may be maintained in the fermenting of the house beer. As the house beer is simply brewed, a user's convenience may be improved.

The use of beer makers capable of easily brewing house beers in households or bars has gradually increased. Such beer makers are preferably configured to allow their use to be convenient while maintaining an optimum temperature for beer fermentation.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary arrangements and embodiments may be described in detail with reference to the accompanying drawings.

Figure 1:
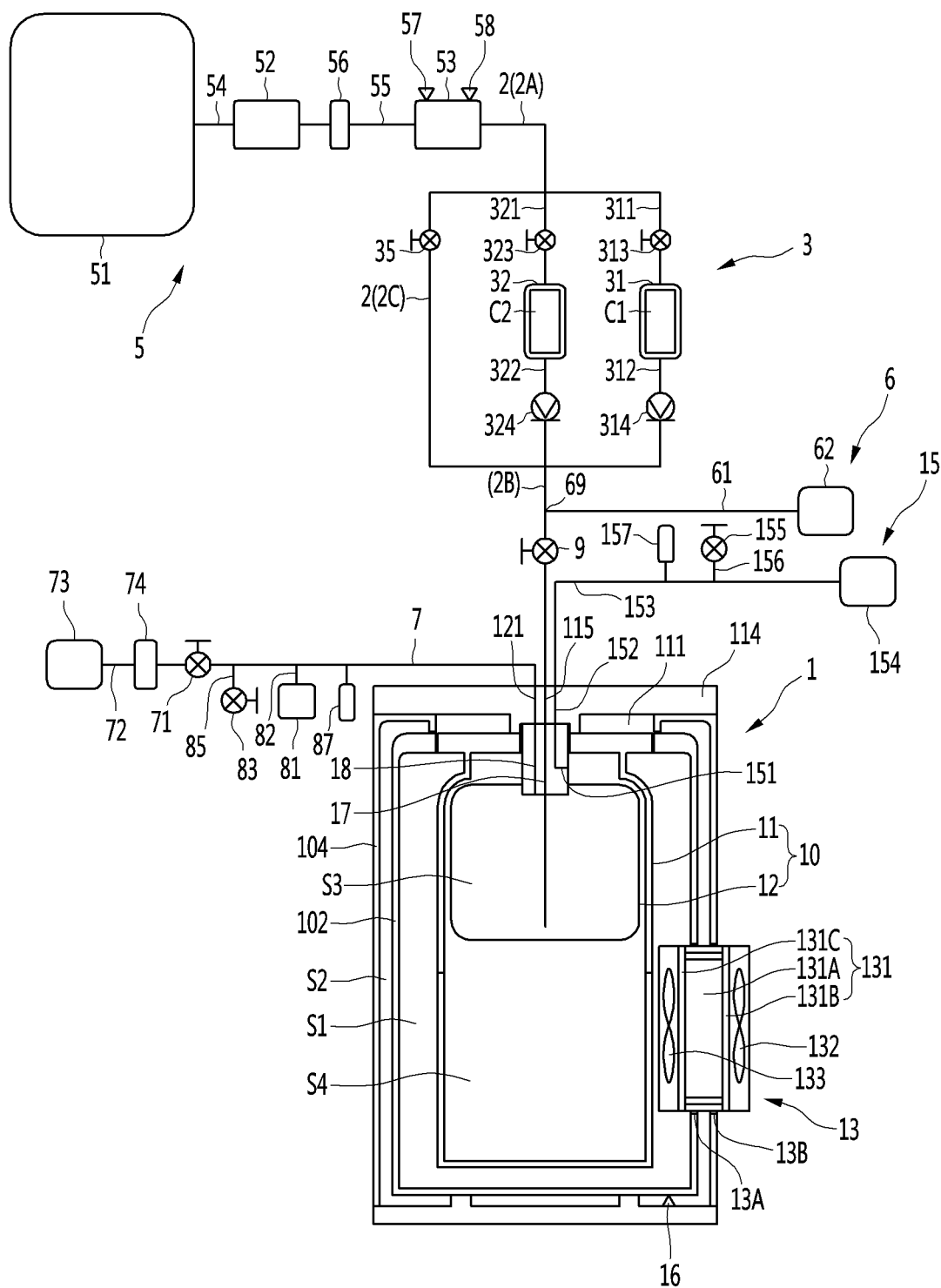
FIG. 1 is a view illustrating a configuration of a beer maker according to a first embodiment.
Figure 2:
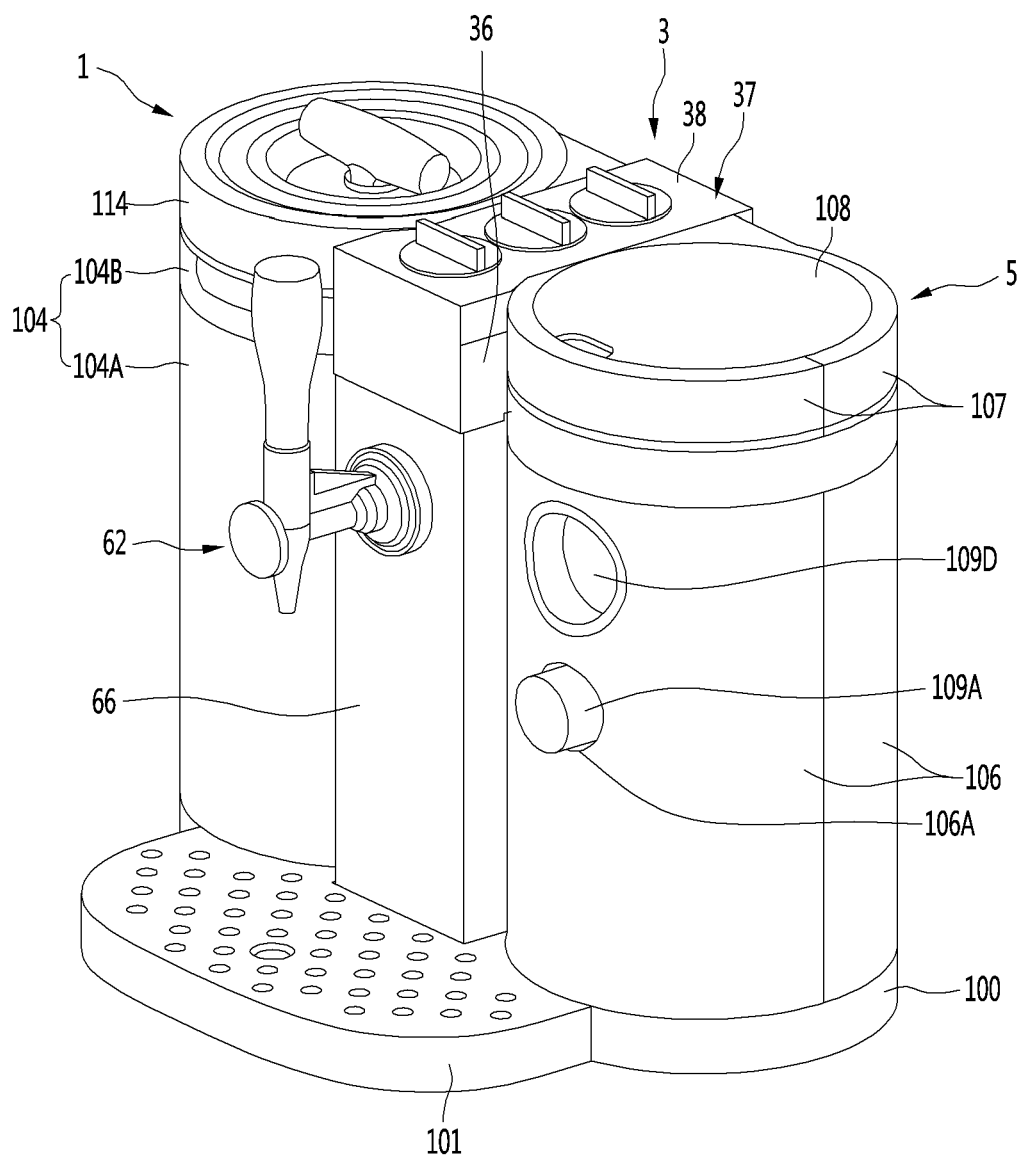
FIG. 2 is a perspective view of the beer maker according to the first embodiment.
Figure 3:
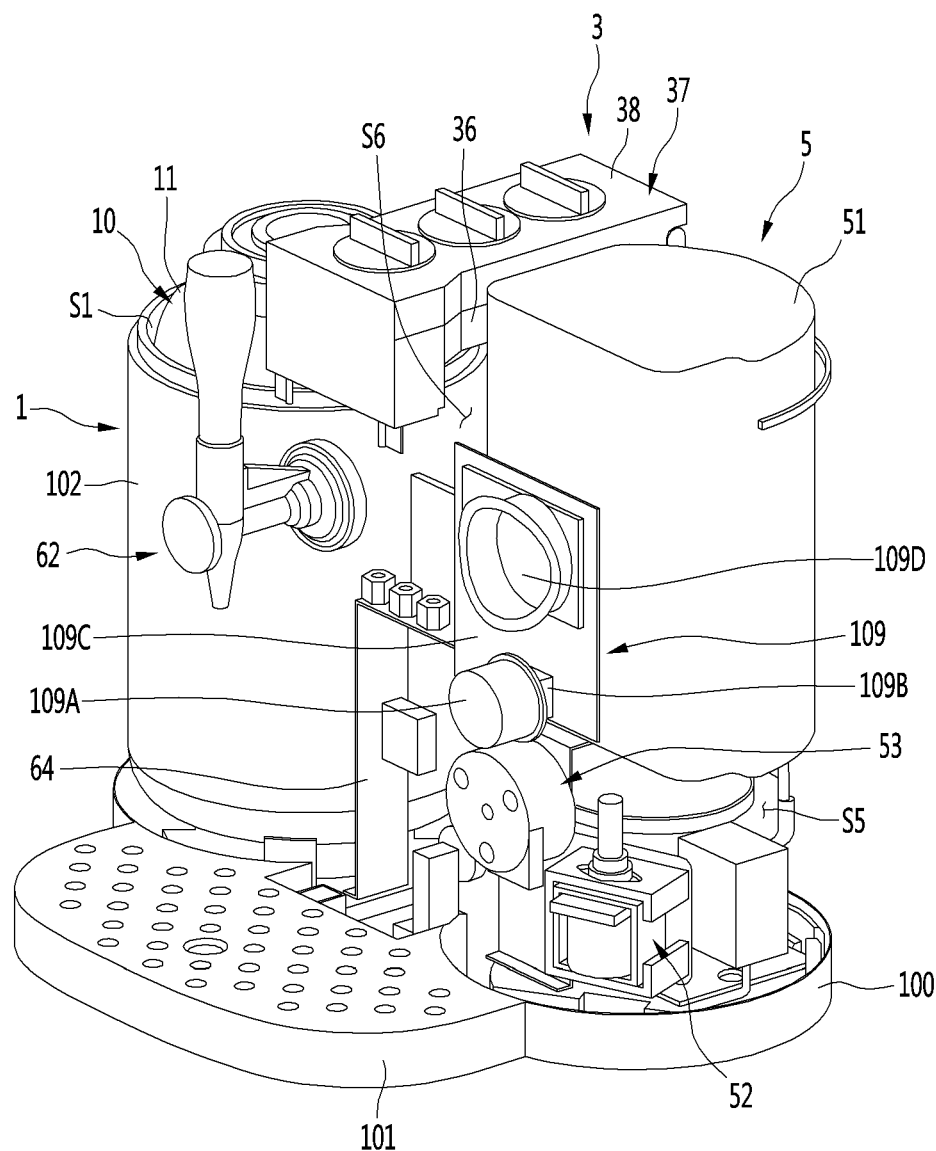
FIG. 3 is a perspective view illustrating an inside of the beer maker according to the first embodiment.
Figure 4:
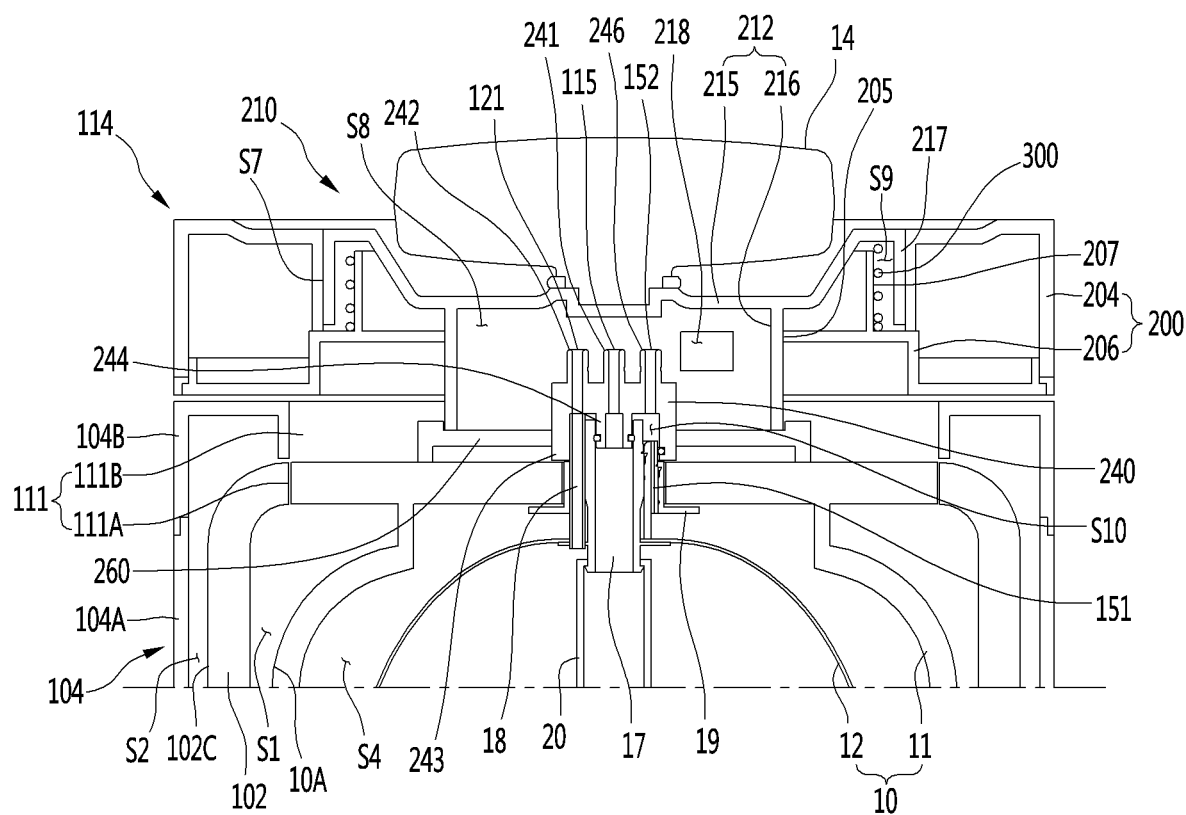
FIG. 4 is a sectional view illustrating an inside of body of the beer maker according to the first embodiment.
Figure 5:
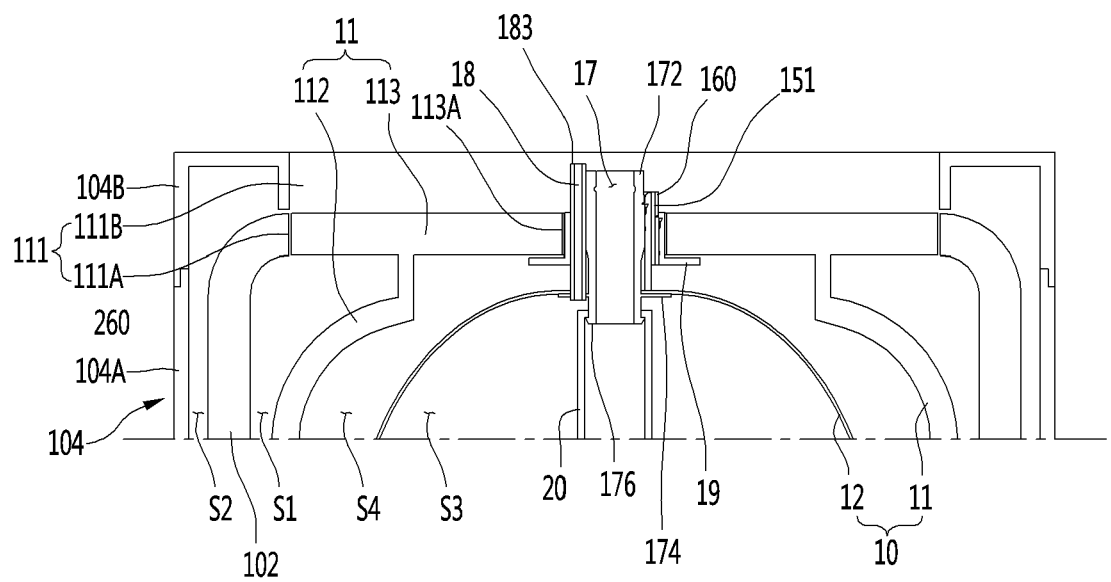
FIG. 5 is a sectional view when an opening shown in FIG. 4 is opened.
Figure 6:
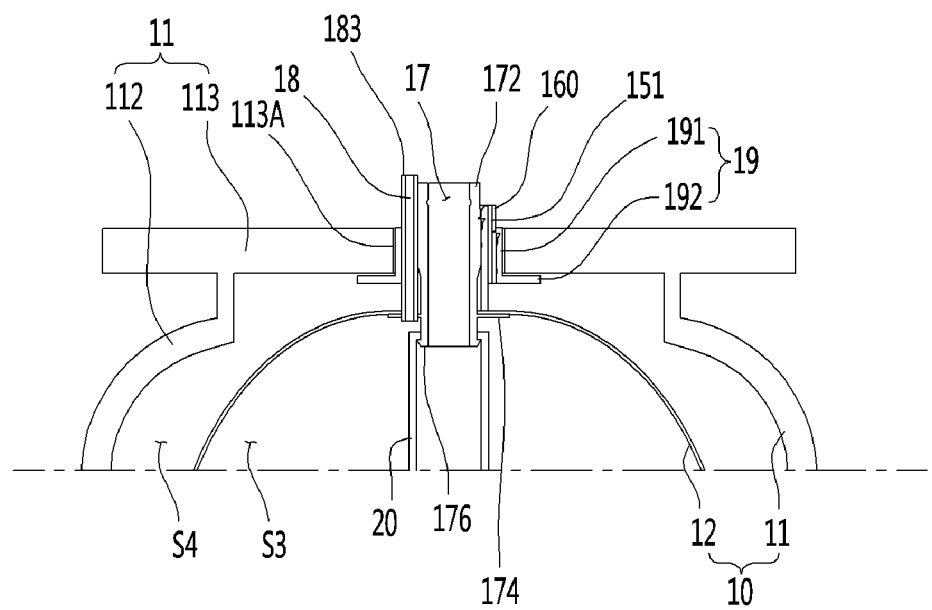
FIG. 6 is a sectional view illustrating an inside of a fermentation vessel of the beer maker according to the first embodiment.

FIG. 1 is a view illustrating a configuration of a beer maker according to a first embodiment. FIG. 2 is a perspective view of the beer maker according to the first embodiment. FIG. 3 is a perspective view illustrating an inside of the beer maker according to the first embodiment. FIG. 4 is a sectional view illustrating an inside of body of the beer maker according to the first embodiment. FIG. 5 is a sectional view when an opening shown in FIG. 4 is opened. FIG. 6 is a sectional view illustrating an inside of a fermentation vessel of the beer maker according to the first embodiment. Other embodiments and configurations may also be provided.

As shown in FIG. 1, a beer maker includes a body 1 having a space S1 formed therein.

The beer maker may include a fermentation vessel 10 (or fermentation container) in which ingredients for brewing beer (i.e., beer ingredients) are contained, and fermentation of beer may be performed. A beer brewing space S3, in which the ingredients are contained, may be provided in the fermentation vessel 10.

The beer maker may include a main channel 2 that guides the ingredients to the beer brewing space S3 therethrough. The main channel 2 may supply the ingredients to the beer brewing space S3 through the body 1.

The beer maker may include an ingredient supplying device 3 in which the ingredients for brewing beer are provided. Also, the beer maker may include a water supply module 5 (or water supply device) that supplies water to the main channel 2 or the ingredient supplying device 3. The beer maker may include a beer extracting device 6 that allows beer that has been completely brewed in the beer brewing space S3 to be extracted to outside of the beer maker.

The body 1 may include a housing in which the space S1 is provided, and a lid 114 that opens/closes the space S1. The body 1 may protect the fermentation vessel 10 accommodated in the space S1. When the fermentation vessel 10 is accommodated in the body 1, transfer of heat at the outside of the body 1 to the fermentation vessel 10 can be minimized, and the transfer of heat of the fermentation vessel 10 to the outside of the body 1 can be minimized.

The space S1 of the housing may be a fermentation vessel accommodating space in which the fermentation vessel 10 is accommodated or provided. The fermentation vessel 10 may be inserted into the space S1 of the housing to be accommodated in the housing. The housing may be a fermentation vessel housing capable of protecting the fermentation vessel 10, and the fermentation vessel 10 may ferment beer in a state in which the fermentation vessel 10 is accommodated in the housing.

An opening 111 may be provided in the housing. The opening 111 may be formed to have a size with which the fermentation vessel 10 can pass therethrough. The fermentation vessel 10 may be inserted into the space S1 through the opening 111 to be accommodated in the space S1.

The opening 111 may be formed at an upper portion of the housing, and the fermentation vessel 10 may be inserted into the space S1 by passing through the opening 111 from the top of the housing. The fermentation vessel 10 may be withdrawn upwardly from the opening 111 by passing through the opening 111 in the space S1.

The housing may be configured as an assembly of a plurality of members. The housing may include an inner housing 102 that protects the fermentation vessel 10 and an outer cover 104 that protects the inner housing 102 by surrounding an outer circumference of the inner housing 102.

The space S1 in which the fermentation vessel 10 is accommodated may be formed in the inner housing 102, and the inner housing 102 may allow the space S1 to be heat-insulated from the outside. The inner housing 102 may be formed of a heat insulating material, and heat transfer between the space S1 and the outside of the inner housing 102 can be minimized.

The space S1 formed in the inner housing 102 may be a fermentation vessel accommodating space in which the fermentation vessel 10 is accommodated or provided.

A space S2 in which the inner housing 102 is accommodated may be provided in the outer cover 104, and the inner housing 102 may protect the fermentation vessel 10 in a state in which the inner housing 102 is accommodated in the space S2 of the outer cover 104. The space S2 formed in the outer cover 104 may be an inner housing accommodating space in which the inner housing 102 is accommodated or provided.

The lid 114 may open/close the space S1 by opening/closing the opening 111. In the body 1, when the opening 111 is covered with the lid 114, a sealed space may be formed between the housing and the lid 114, and beer ingredients may be fermented in the fermentation vessel 10 accommodated in the sealed space formed between the housing and the lid 114, thereby brewing beer.

The lid 114 may be used to open/close the inside of the housing, and may be disposed at the upper portion of the housing to cover the opening 111 After the fermentation vessel 10 is inserted into the space S1 of the housing, a user may cover the opening 111 of the housing with the lid 114.

The lid 114 may be rotatably connected to the housing by a hinge. As one example, the lid 114 may be separably attached to the housing. As another example, the lid 114 may be put on the housing and then rotated in one direction to be inserted into the housing, or be rotated in an opposite direction to be separated from the housing. As still another example, the lid 114 may be press-fitted into the housing in the direction from an upper side to a lower side of the housing to seal the opening 111, or be separated from the housing in the upper direction at the upper portion of the housing.

A body main channel 115 may be provided in the body 1. The body main channel 115 may be a portion of the main channel 2. The body main channel 115 may be connected to an outer main channel 2B. The body main channel 115 may guide an ingredient supplied through the outer main channel 2B to the fermentation vessel 10.

The body main channel 115 may be provided in the housing or the lid 114, or be formed between the housing and the lid 114.

When the body main channel 115 is provided in the lid 114, the body main channel 115 may be connected to the fermentation vessel 10 when the lid 114 is closed.

As an example, the fermentation vessel 10 may include a fermentation container main channel 17 that allows the body main channel 115 to communicate with the beer brewing space S3 therethrough. The fermentation container main channel 17 may be a portion of the main channel 2.

In this example, the body main channel 115 may communicate with the fermentation container main channel 17. When the lid 114 is opened, the body main channel 115 may be separated from the fermentation container main channel 17. When the lid 114 is closed, the body main channel 115 may communicate with the fermentation container main channel 17.

The body main channel 115 may allow the outer main channel 2B to communicate with the fermentation container main channel 17 between the outer main channel 2B and the fermentation container main channel 17. An ingredient in the outer main channel 2B may sequentially pass through the body main channel 115 and the fermentation container main channel 17 and then be input into the beer brewing space S3.

As another example, in the fermentation vessel 10, the beer brewing space S3 may directly communicate with the body main channel 115 without the separate fermentation container main channel 17.

When the lid 114 is opened, the body main channel 115 may be separated from the beer brewing space S3. When the lid 114 is closed, the body main channel 115 may directly communicate with the beer brewing space S3.

In this example, an ingredient in the outer main channel 2B may pass through the body main channel 115 and then be directly input into the beer brewing space S3.

The fermentation vessel 10 may be inserted into the space S1 of the housing to be provided in the housing, and the fermentation vessel 10 may be smaller than the space S1 of the housing. The fermentation vessel 10 may be inserted and accommodated in the housing in a state in which ingredients are accommodated therein. The fermentation vessel 10 may assist fermentation of beer ingredients in a state in which the fermentation vessel 10 is accommodated in the space S1 sealed by the housing and the lid 114.

The fermentation vessel 10 may be inserted into the housing such that the outer circumferential surface of the fermentation vessel 10 is spaced apart from the inner circumferential surface of the housing. In this example, gas flowed by a heat absorbing fan 133, which will be described below, may rapidly cool the entire fermentation vessel 10 while flowing between the outer circumferential surface of the fermentation vessel 10 and the inner circumferential surface of the housing.

The fermentation vessel 10 is a vessel (or space) in which ingredients for brewing beer are provided, and the fermentation vessel 10 may be configured as an assembly of a plurality of members. The beer brewing space S3 in which ingredients are contained to ferment beer may be provided in the fermentation vessel 10.

The fermentation vessel 10 may be a fermentation tank in which beer is brewed by fermenting ingredients contained therein.

The fermentation vessel 10 may be configured as a fixed type fermentation vessel that is fixedly mounted in the housing, or the fermentation vessel 10 may be configured as a separate type fermentation vessel that is inserted into the housing to be accommodated in the housing, and separated to outside of the housing, if necessary.

The fermentation vessel 10 may be provided as a single structure or as a multi-structure.

When the fermentation vessel 10 is provided in the single structure, the fermentation vessel 10 may include a flexible container that has the beer brewing space S3 formed therein and is expandable and contractible. When the fermentation vessel 10 is provided in the single structure, the fermentation vessel 10 does not include an outer vessel 11, which will be described below but may include the flexible container. In this example, the flexible container may be detachably disposed in the body 1. The flexible container may be separably mounted in the housing, or the flexible container may be detachably connected to the lid 114.

When the fermentation vessel 10 is provided in the multi-structure, the fermentation vessel 10 may include the outer vessel 11 (or outer container) and an inner vessel 12 (or inner container).

The outer vessel 11 may provide an appearance of the fermentation vessel 10. The outer vessel 11 may be an outer tank that protects the inner vessel 12. An inner vessel accommodating space S4, in which the inner vessel 12 is expandably accommodated, may be provided in the outer vessel 11.

The outer vessel 11 may be formed of a material having a strength higher than the inner vessel 12. The outer vessel 11 may be formed of a material that minimizes expansion and contraction of the outer vessel 11, caused by gas between the outer vessel 11 and the inner vessel 12. The outer vessel 11 may be formed of a material capable of protecting the inner vessel 12, e.g., a synthetic resin such as PED or a metal such as aluminum or steel.

The outer container 11 may be accommodated in the space S1 of the housing to be withdrawable to outside of the housing. The outer vessel 11 may be detachably connected to the lid 114, or the outer vessel 11 may be detachably provided in the housing.

When the fermentation vessel 10 is inserted into the space S1 of the inner housing 102, the outer circumferential surface of the outer vessel 11 may be spaced apart from the inner circumferential surface of the inner housing 102, and a gap through which gas in the inner housing 102 flows may be formed between the outer circumferential surface of the outer vessel 11 and the inner circumferential surface of the inner housing 102.

The inner vessel 12 may be accommodated in the outer vessel 11. The beer brewing space S3 may be formed in the inner vessel 12. The inner vessel 12 may allow beer ingredients in the beer brewing space S3 to be fermented in a state in which the inner vessel 12 is accommodated in the outer vessel 11.

The inner vessel 12 may be directly connected to the outer vessel 11, or the inner vessel 12 may be connected to the outer vessel 11 by a separate connector (or channel body). The inner vessel 12 may be moved together with the outer vessel 11 when the outer vessel 11 is moved.

The inner vessel 12 may include a flexible container that is entirely or partially expandable and contractible. The inner vessel 12 may include a flexible container that is expandable and compressible. The inner vessel 12 may be expanded by a pressure therein while beer is being brewed. The inner vessel 12 may be compressed by gas injected between the inner vessel 12 and the outer vessel 11. The inner vessel 12 may be formed of a material having a ductility lower than the outer vessel 11. The inner vessel 12 may have a thickness thinner than the outer vessel 11.

When the fermentation container main channel 17 is provided in the fermentation vessel 10, the fermentation container main channel 17 may be provided in the outer vessel 11, or may be provided in the connector (or channel body).

The beer maker may include a temperature regulating device 13 that regulates a temperature of the fermentation vessel 10. The temperature regulating device 13 may be provided at the body 1. The temperature regulating device 13 may regulate the temperature of the fermentation vessel 10 by heating or cooling the inside of the housing.

The temperature regulating device 13 may be mounted to the body 1 to heat or cool the fermentation vessel 10. The temperature regulating device 13 may be connected to the body 1 through a duct and may be located at the outside of the body 1 to heat or cool the fermentation vessel 10.

When the temperature regulating device 13 is mounted at the body 1, the temperature regulating device 13 may be in contact with the fermentation vessel 10 to vary the temperature of the fermentation vessel 10. Alternatively, the temperature regulating device 13 may vary the temperature of the fermentation vessel 10 by blowing gas in the housing to the temperature regulating device 13 and then supplying the gas to the fermentation vessel 10, without being in contact with the fermentation vessel 10.

When the temperature regulating device 13 is connected to the body 1 through the duct, the temperature of the fermentation vessel 10 may be varied by gas that circulates inside of the body 1, the duct, and the temperature regulating device 13.

The temperature regulating device 13 may include a refrigeration cycle device that includes a compressor, a condenser, an expansion device, and an evaporator to increase or decrease a temperature in the housing. When the temperature regulating device 13 includes the refrigeration cycle device, any one of the condenser and the evaporator may be disposed in the space S1 of the housing, and the other of the condenser and the evaporator may be disposed at the outside of the housing.

When the evaporator is disposed in the space S1 of the housing, the condenser may be disposed at the outside of the housing, and the refrigeration cycle device may serve as a cooler that cools the fermentation vessel 10.

When the condenser is disposed in the space S1 of the housing, the evaporator may be disposed outside of the housing, and the refrigeration cycle device may serve as a heater that heats the fermentation vessel 10.

The refrigeration cycle device may include a channel switching valve (not shown). The channel switching valve may be configured as a four-way valve. The channel switching valve may be connected to each of an inlet channel of the compressor and an outlet channel of the compressor. The channel switching valve may be connected to the condenser through a condenser connection channel, and may be connected to the evaporator through an evaporator connection channel. When the fermentation vessel 10 is cooled, the channel switching valve may guide a refrigerant compressed by the compressor to the condenser and guide a refrigerant discharged from the evaporator to the compressor 131. When the fermentation vessel 10 is heated, the channel switching valve may guide the refrigerant compressed by the compressor to the evaporator and guide the refrigerant discharged from the condenser to the compressor. When the refrigeration cycle device includes the channel switching valve, the refrigeration cycle device may cool or heat the fermentation vessel 10.

The temperature regulating device 13 may include an electric heater that generates heat when power is applied thereto to increase the temperature in the housing.

The temperature regulating device 13 may include a thermoelectric module (TEM) that increases or decreases temperature in the housing. The TEM may also be called as thermoelectric device.

The TEM may be used to cool or heat the space S1 of the housing in which the fermentation vessel 10 is accommodated. The TEM may regulate the fermentation vessel 10 to have an optimum temperature for fermenting beer.

The TEM may include a thermoelectric element 131. The thermoelectric element 131 may include a semiconductor element 131A, a heat dissipating plate 131B, and a heat absorbing plate 131C.

Any one of the heat absorbing plate 131C and the heat dissipating plate 131B may be disposed in the space S1 of the housing, and the other one of the heat absorbing plate 131C and the heat dissipating plate 131B may be disposed at the outside of the housing.

When the heat absorbing plate 131C is disposed in the space S1 of the housing, the heat dissipating plate 131C may be disposed at the outside of the housing, and the TEM may serve as a cooler that cools the fermentation vessel 10.

When the heat dissipating plate 131B is disposed in the space S1 of the housing, the heat absorbing plate 131A may be disposed at the outside of the housing, and the TEM may serve as a heater that heats the fermentation vessel 10.

An example may be described where the heat absorbing plate 131C is disposed in the space S1 of the housing and the heat dissipating plate 131B is disposed at the outside of the housing will be described.

The TEM may be disposed to pass through the housing. A through-hole 13A and 13B may be provided in the housing to allow the TEM to pass therethrough.

When the housing includes the inner housing 102 and the outer cover 104, an inner through-hole 13A may be formed in the inner housing 102, and an outer through-hole 13B may be formed in the outer cover 104.

The TEM may include a heat dissipating fan 132 that allows gas to flow to the heat dissipating plate 131B. The TEM may include the heat absorbing fan 133 that allows gas to flow about the heat absorbing plate 131C.

The heat absorbing fan 133 may allow gas to circulate in the housing. The heat absorbing fan 133 may be installed to be provided in the inner housing 102, and allow gas between the inner surface of the inner housing 102 and the outer surface of the fermentation vessel 10 to flow to the heat absorbing plate 131C. The gas flowing to the heat absorbing plate 131C may be cooled by the heat absorbing plate 131C, and the gas may circulate between the inner surface of the inner housing 102 and the outer surface of the fermentation vessel 10.

Since the beer maker includes the heat absorbing fan 133, the fermentation vessel 10 can be cooled through air cooling.

The beer maker may not include the heat absorbing fan 133. In this example, when the fermentation vessel 10 is inserted into the housing, the fermentation vessel 10 is preferably disposed to be in contact with the heat absorbing plate 131C.

In the beer maker, the thermoelectric element 131, the heat dissipating fan 132, and the heat absorbing fan 133 may all be disposed outside of the body 1. In this example, the TEM may be connected to inside of the housing through an inlet duct and an outlet duct. When the heat absorbing fan 133 is driven, gas in the housing may pass through the inlet duct and flow to the heat absorbing plate 131 to be cooled by the heat absorbing plate 131C. Additionally, the gas cooled by the heat absorbing plate 131C may be introduced into the housing through the outlet duct. When the heat absorbing fan 133 is driven, gas may cool from the fermentation vessel 10 while circulating the inside of the housing and the heat absorbing plate 131C.

In the beer maker, the inner housing 102 may be formed of a material having a high heat transfer rate, and gas between the inner housing 102 and the outer cover 104 may flow to the thermoelectric element 131 to be heated or cooled and then flow between the inner housing 102 and the outer cover 104.

In this example, the space S1 of the inner housing 102 may be heated or cooled by the gas heated or cooled by the thermoelectric element 131, and the fermentation vessel 10 accommodated in the space S1 of the inner housing 102 may be heated or cooled. That is, the inner housing 102 may serve as a fermentation tank that heats or cools the fermentation vessel 10 accommodated therein.

The main channel 2 may connect the ingredient supplying device 3 and the beer brewing space S3 to each other. The main channel 2 may guide ingredients discharged from the ingredient supplying device 3 to the beer brewing space S3.

The ingredient supplying device 3 may be disposed outside of the space S1. The ingredient supplying device 3 may be disposed outside of the body 1, and ingredients for brewing beer may move from the ingredient supplying device 3 to the beer brewing space S3 through the main channel 2. The main channel 2 may communicate with each of the ingredient supplying device 3 and the beer brewing space S3, and guide the ingredients to each of the ingredient supplying device 3 and the beer brewing space S3.

The main channel 2 may include the outer main channel 2B. The outer main channel 2B may be connected to the ingredient supplying device 3. The outer main channel 2B may guide ingredients discharged from the ingredient supplying device 3.

At least a portion of the outer main channel 2B may be disposed at the outside of the space S1 of the housing. A portion of the outer main channel 2B may be disposed in the body 1, and the remainder of the outer main channel 2B may be disposed between the body 1 and the ingredient supplying device 3. The whole of the outer main channel 2B may be disposed between the body 1 and the ingredient supplying device 3.

The outer main channel 2B may extend from the ingredient supplying device 3 to the body 1, and the body main channel 115, connected to the outer main channel 2B, may be provided in the body 1.

The body main channel 115 may guide ingredients moved through the outer main channel 2B to the fermentation vessel 10. In this example, the main channel 2 may include the outer main channel 2B that has one end connected to the ingredient supplying device 3 and the other end connected to the body main channel 115.

The body main channel 115 may be provided in at least one of the housing and the lid 114.

The body main channel 115 may be provided in at least one of the housing and the lid 114. In this example, a channel port that forms the body main channel 115 may be provided in at least one of the housing and the lid 114. The channel port may be a part of the body 1, and may be a part of the housing or the lid 114.

When the channel port is not a part of the body 1, the body main channel 115 may be formed by a separate ingredient supply tube. In this example, the ingredient supply tube may be disposed to pass through at least one of the housing and the lid 114, or may be disposed to pass between the housing and the lid 114.

The main channel 2 may guide water, gas, or ingredients to the beer brewing space S3 of the fermentation vessel 10.

The main channel 2 may include a supply channel 2A disposed prior to the ingredient supplying device 3 in a flow direction of water or gas, and the outer main channel 2B disposed posterior to the ingredient supplying device 3 in the flow direction of water or gas.

The supply channel 2A is a channel through which water or gas is supplied to the ingredient supplying device 3, and the supply channel 2A may be connected to the ingredient supplying device 3. The supply channel 2A may be a water supply connection channel connected to the water supply module 5 and the ingredient supplying device 3.

At least a portion of the outer main channel 2B may be disposed at the outside of the space S1, and may be connected to the ingredient supplying device 3 to guide ingredients moved from the ingredient supplying device 3. The outer main channel 2B may be a body connection channel connected to the ingredient supplying device 3 and the body main channel 115.

The main channel 2 may include a bypass channel 2C that connects the supply channel 2A and the outer main channel 2B to each other and allows water or gas to bypass the ingredient supplying device 3.

The bypass channel 2C may connect the supply channel 2A and the outer main channel 2B to each other, and guide water or gas in the supply channel 2A to bypass the ingredient supplying device 3 and then flow to the outer main channel 2B. A bypass valve 35 that opens/closes the bypass channel 2C may be installed in the bypass channel 2C (or at the bypass channel 2C).

When the beer maker includes the ingredient supplying device 3, the main channel 2 may include all of the supply channel 2A, the outer main channel 2B, and the bypass channel 2C.

On the other hand, when the beer maker does not include the ingredient supplying device 3, the main channel 2 may be configured as a single channel.

The ingredient supplying device 3 may be connected to the main channel 2. An ingredient accommodating part that accommodates ingredients for brewing beer may be provided in the ingredient supplying device 3 (or at the ingredient supply device). Water or gas in the supply channel 2A may be introduced into the ingredient supplying device 3 to flow in the ingredient supplying device 3.

The ingredient supplying device 3 allows ingredients to be input into the fermentation vessel 10 to be arbitrarily accommodated therein. Water or gas supplied from the supply channel 2A may be mixed with the ingredients accommodated in the ingredient supplying device 3 while passing through the ingredient supplying device 3, and the ingredients may flow to the outer main channel 2B together with the water or gas. The mixture of the water and ingredients or the gas and ingredients may be supplied to the beer brewing space S3 of the fermentation vessel 10 along the main channel 2.

Ingredients for brewing beer may include water, malt, yeast, hop, flavor additives, and/or the like.

The beer maker may include both the ingredient supplying device 3 and the fermentation vessel 10, and the ingredients for brewing beer may be distributed and accommodated in the ingredient supplying device 3 and the fermentation vessel 10. Some ingredients among the ingredients for brewing beer may be accommodated in the fermentation vessel 10. The other ingredients accommodated in the ingredient supplying device 3 may be supplied to the fermentation vessel 10 together with the water or gas flowing in the supply channel 2A, and may be mixed with the ingredients that have already been accommodated in the fermentation vessel 10.

A main ingredient that is essential to brew beer may be accommodated in the fermentation vessel 10, and additives added to the main ingredient may be accommodated in the ingredient supplying device 3. In this example, additives accommodated in the ingredient supplying device 3 may be mixed with the water or gas flowing in the supply channel 2A to be supplied to the fermentation vessel 10, and may be mixed with the main ingredient accommodated in the fermentation vessel 10.

The main ingredient accommodated in the fermentation vessel 10 may be an ingredient of which amount is larger than that the other ingredients, and may include the malt and the yeast among the malt, the yeast, the hop, and the flavor additives. Additionally, the additives accommodated in the ingredient supplying device 3 may be the other ingredients except the malt among the ingredients for brewing beer, and may include the hop, the flavor additives, and/or the like.

The beer maker may not include the ingredient supplying device 3, but may include the fermentation vessel 10. In this example, the main ingredient may be accommodated in the fermentation vessel 10, and the user may directly input the additives into the fermentation vessel 10.

If the beer maker includes both the ingredient supplying device 3 and the fermentation vessel 10, beer can be simply brewed as compared with when the beer maker does not include the ingredient supplying device 3.

An example where the beer maker includes both the ingredient supplying device 3 and the fermentation vessel 10 may be described as an example. However, embodiments are not limited thereto.

At least one ingredient accommodating part may be provided in the ingredient supplying device 3. A plurality of ingredient accommodating parts may be formed in the ingredient supplying device 3. In this example, the plurality of ingredient accommodating parts may be partitioned from each other.

An ingredient may be directly provided in the ingredient accommodating part formed in the ingredient supplying device 3. The ingredient of the ingredient accommodating part may be mixed with water or gas flowing from the supply channel 2A to the ingredient accommodating part to flow to the outer main channel 2B.

An ingredient may be accommodated in the ingredient accommodating part in a state in which the ingredient is contained in an ingredient container C1 or C2. The ingredient in the ingredient container C1 or C2 may be mixed with the water or gas flowing from the supply channel 2A to the ingredient accommodating part to flow to the outer main channel 2B.

The ingredient container C1 or C2 may be a component that contains an ingredient therein, such as a pod or a capsule. When the ingredient container C1 or C2 is accommodated in the ingredient accommodating part, the ingredient accommodating part may be an ingredient container accommodating part that accommodates the ingredient container therein.

As an example, when an ingredient is contained in a capsule and the capsule is accommodated in the ingredient accommodating part, the ingredient accommodating part of the ingredient supplying device 3 may be a capsule accommodating part in which a capsule is accommodated. At least one capsule accommodating part in which the capsule is accommodated may be provided in the ingredient supplying device 3. The ingredient supplying device 3 may be configured to enable a capsule to be mounted therein or withdrawn therefrom. The ingredient supplying device 3 may be configured as a capsule kit assembly in which a capsule is separably accommodated.

Water or gas in the supply channel 2A may be mixed with an ingredient while passing through the ingredient accommodating part or the ingredient container, and the ingredient accommodated in the ingredient accommodating part or the ingredient container may flow to the outer main channel 2B together with the water or gas.

Different kinds of additives may be accommodated in the ingredient supplying device 3 to be separated from each other. Additives accommodated in the ingredient supplying device 3 may include hop and flavor additives. The hop and flavor additives may be accommodated in the ingredient supplying device 3 to be separated from each other.

When a plurality of ingredient accommodating parts are provided in the ingredient supplying device 3, each of the plurality of ingredient accommodating parts may be connected to the supply channel 2A through an ingredient supplying device entrance channel, and may be connected to the outer main channel 2B through an ingredient supplying device exit channel.

The ingredient accommodating part (of the ingredient supplying device 3) and the ingredient container accommodating part (of the ingredient supplying device 3) may have the same configuration. Each of the example where the ingredient is directly accommodated in the ingredient accommodating part and the example where the ingredient is accommodated in the ingredient accommodating part in the state in which the ingredient is contained in the beer container C1 or C2 may be defined as an example where the ingredient is accommodated in the ingredient accommodating part.

An ingredient accommodating part in which an ingredient container having an additive accommodated therein is detachably accommodated may be provided in the ingredient supplying device 3. The ingredient accommodating part may be connected to the main channel 2 through an ingredient supplying device entrance channel, and may be connected to the main channel 2 through an ingredient supplying device exit channel.

An opening/closing valve that opens/closes the ingredient supplying device entrance channel may be installed in (or at) the ingredient supplying device entrance channel.

A check valve that prevents water or gas from flowing backward to the ingredient accommodating part through the ingredient supplying device exit channel may be installed in (or at) the ingredient supplying device exit channel.

A plurality of ingredient accommodating parts 31 and 32 may be formed in (or at) the ingredient supplying device 3. The plurality of ingredient accommodating parts 31 and 32 may be formed to be distinguished from each other. An ingredient supplying device entrance channel and an ingredient supplying device exit channel may be connected to each of the plurality of ingredient accommodating parts 31 and 32.

An example where a first additive and a second additive are accommodated in the ingredient supplying device 3 may now be described in detail as an example. The first additive may be hop, and the second additive may be a flavor additive. The first additive may be yeast, and the second additive may be a flavor additive.

The ingredient supplying device 3 may include a first ingredient accommodating part 31 in which a first ingredient container C1 having the first additive accommodated therein is accommodated, and a second ingredient accommodating part in which a second ingredient container C2 having the second additive accommodated therein is accommodated.

A first ingredient supplying device entrance channel 311 that guides water or gas to the first ingredient accommodating part 31 may be connected to the first ingredient accommodating part 31. A first opening/closing valve 313 that opens/closes the first ingredient supplying device entrance channel 311 may be installed in (or at) the first ingredient supplying device entrance channel 311.

Additionally, a first ingredient supplying device exit channel 312 that guides at least one of water discharged from the first ingredient accommodating part 31, a mixture of the water and the first additive, and gas may be connected to the first ingredient accommodating part 31. A first check valve 314 that prevents the water, the mixture of the water and the first additive, and the gas from flowing backward to the first ingredient accommodating part 31 through the first ingredient supplying device exit channel 312 may be installed in (or at) the first ingredient supplying device exit channel 312.

A second ingredient supplying device entrance channel 321 that guides water or gas to the second ingredient accommodating part 32 may be connected to the second ingredient accommodating part 32. A second opening/closing valve 323 that opens/closes the second ingredient supplying device entrance channel 321 may be installed in (or at) the second ingredient supplying device entrance channel 321.

Additionally, a second ingredient supplying device exit channel 322 that guides water discharged from the second ingredient accommodating part, a mixture of the water and the second additive, and gas may be connected to the second ingredient accommodating part 32. A second check valve 324 that prevents the water, the mixture of the water and the second additive, and the gas from flowing backward to the second ingredient accommodating part 32 may be installed in (or at) the second ingredient supplying device exit channel 322.

When the beer maker includes the ingredient supplying device 3, the bypass channel 2C may be connected in parallel to each of the channels of the first ingredient accommodating part 31 and the channels of the second ingredient accommodating part 32.

The supply channel 2A may be connected to each of the first ingredient supplying device entrance channel 311, the second ingredient supplying device entrance channel 321, and the bypass channel 2C. The supply channel 2A may include a common tube connected to the water supply module 5, and a plurality of branch tubes that branches off from the common tube to be connected to the first ingredient supplying device entrance channel 311, the ingredient supplying device entrance channel 321, and the bypass channel 2C.

The outer main channel 2B may be connected to each of the first ingredient supplying device exit channel 312, the second ingredient supplying device exit channel 322, and the bypass channel 2C. The outer main channel 2B may include a common tube connected to the body main channel 115, and a plurality of branch tubes that connect the first ingredient supplying device exit channel 312, the second ingredient supplying device exit channel 322, and the bypass channel 2C to the common tube.

When the bypass valve 35 is closed, water or gas supplied to the supply channel 2A may bypass the bypass channel 2C by passing through the ingredient accommodating part 31 or 32, and flow to the outer main channel 2B.

When the opening/closing valve 313 or 323 is closed, the water or gas supplied to the supply channel 2A may bypass the ingredient accommodating part 31 or 32 by passing through the bypass channel 2C, and flow to the outer main channel 2B.

The water supply module 5 may be connected to the main channel 2 to supply water to the main channel 2. The water supply module 5 may be connected to the supply channel 2A of the main channel 2, and supply water to the supply channel 2A.

The water supply module 5 may include a water tank 51 in which water is contained, and a water supply heater 53 that heats water. The water supply module 5 may pump water from the water tank 51 using a water supply pump 52. The water supply pump 52 may pump water to the water supply heater 53, and the water supply heater 53 may heat the water pumped by the water supply pump 52. When the water supply module 5 includes all of the water tank 51, the water supply pump 52, and the water supply heater 53, the water tank 51, the water supply pump 52, and the water supply heater 53 may be sequentially disposed in a flow direction of water in the water supply module 5.

A water tank outlet channel 54 may be connected to the water tank 51, and the water supply pump 52 may be connected to the water tank outlet channel 54.

A water supply pump outlet channel 55 may be connected to the water supply pump 52, and the water supply heater 53 may be connected to the water supply pump outlet channel 55.

A flow meter 56 that measures a flow rate of the water supply pump outlet channel 55 may be installed in (or at) the water supply pump outlet channel 55.

The water supply heater 53 may be a mold heater, and may include a heater case through which the water pumped by the water supply pump 52 passes, and a heater installed in the heater case to heat water introduced into the heater case. A thermistor 57 that measures a temperature of the water supply heater 53 may be installed in the water supply heater 53. Additionally, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet channel 54, the water supply pump 52, and the water supply pump outlet channel 55. The water guided to the water supply heater 53 may be heated by the water supply heater 53 and then guided to the main channel 2.

The water supply module 5 may not include the water tank 51, the water supply pump 52, and the water supply heater 53, but may include a water supply tube that is directly connected to a water faucet or connected to the water faucet through a separate connection hose to guide water supplied from the water faucet to the main channel 2. The water supply module 5 may not include the water tank 51 and the water supply pump 52, but may include a water supply tube and the water supply heater 53 installed in the water supply tube.

The water supply module 5 may not include the water tank 51 and the water supply pump 52, but may include a water supply tube that is directly connected to a water faucet or connected to the water faucet through a separate connection hose to guide water to the main channel 2 and the water supply heater 53 installed in the water supply tube.

The beer maker may be directly connected to a water faucet or connected to the water faucet through a separate connection hose, without the above-described water supply module 5.

The beer extracting device 6 may be connected to at least one of the main channel 2, the fermentation vessel 10, and the body 1.

When the beer extracting device 6 is connected to the fermentation vessel 10 or the body 1, beer in the beer brewing space S3 may be directly moved to the beer extracting device 6 and then extracted from the beer extracting device 6 to outside of the beer maker.

When the beer extracting device 6 is connected to the main channel 2, beer in the beer brewing space S3 may flow to the beer extracting device 6 through the main channel 2 and then extracted from the beer extracting device 6 to outside of the beer maker.

The beer extracting device 6 may be connected to the outer main channel 2B in the main channel 2.

Ingredients in the inner vessel 12 may ferment as time elapses, and beer that has been completely brewed in the fermentation vessel 10 may flow to the outer main channel 2B through the fermentation container main channel 17 and the body main channel 115. The beer extracting device 6 may be connected to the outer main channel 2B, and beer flowing from the beer brewing space S3 to the outer main channel 2B may be extracted to the outside through the beer extracting device 6.

The beer maker may include a beer extraction channel 61 through which beer is guided. The beer extracting device 6 may include a dispenser 62 connected to the beer extraction channel 61. The beer extraction channel 61 may be connected between the ingredient supplying device 3 and a main valve 9 in the main channel 2. The beer extraction channel 61 may be connected to the outer main channel 2B. The beer extraction channel 61 may be connected between the ingredient supplying device 3 and the main valve 9 in the outer main channel 2B.

The beer extraction channel 61 may be connected to the main channel 2 through a beer extraction channel connection part 69.

An anti-foaming path may be provided in the beer extraction channel 61, and a mesh or the like, by which foam is filtered, may be provided in the anti-foaming path. Foam of the beer flowing from the main channel 2 to the beer extraction channel 61 may be minimized by passing through the anti-foaming path.

The dispenser 62 may include a tap valve having a lever that the user manipulates. A micro switch that detects a manipulation of the user may be installed in (or at) the dispenser 62.

The beer maker may include a sub-channel. The sub-channel may communicate with the beer brewing space S3, and gas may pass through the sub-channel.

In the state in which the fermentation vessel 10 is accommodated in the body 1, the beer maker may supply gas to the sub-channel, and the gas may be injected into the beer brewing space S3 of the fermentation vessel 10 by passing through the sub-channel.

The beer maker may include a gas pump 73 connected to the sub-channel, and the gas pump 73 may pump gas to the sub-channel. When the gas pump 73 is driven, external gas may be pumped to the sub-channel by the gas pump 73, and the sub-channel may guide the gas pumped by the gas pump 73 to the beer brewing space S3.

The beer maker may include a gas valve 71 installed in (or at) the sub-channel. The sub-channel is in a state in which the sub-channel communicates with the beer brewing space S3, and the gas valve 73 may restrict gas in the beer brewing space S3 from being discharged to the outside through the sub-channel.

The beer maker may include a filter 74 installed in (or at) the sub-channel to allow gas to pass therethrough. When the gas pump 73 is driven, gas may pass through the filter 74 and then flow to the beer brewing space S3, and foreign substances including dust and the like may be filtered by the filter 74. The beer maker may inject clean gas from which dust and the like are filtered by the filter 74 into the beer brewing space S3.

The sub-channel may be described in detail.

The sub-channel may include an outer sub-channel 7 of which at least a portion is disposed outside of the body 1. The beer maker may supply gas to the body 1 through the outer sub-channel 7.

The outer sub-channel 7 is a channel connected to the body 1, and at least a portion of the outer sub-channel 7 may extend to the outside of the body 1.

The outer sub-channel 7 may guide gas pumped by the gas pump 73 to be injected into the beer brewing space S3.

The gas valve 71 may be connected to the outer sub-channel 7. The gas valve 71 may be opened when gas is injected into the beer brewing space S3. The gas valve 71 may be opened when the gas pump 73 is driven.

Additionally, the sub-channel may include a gas injection channel 72 that connects the gas pump 73 and the gas valve 71 to each other. The gas pump 73 may be connected to the gas valve 71 through the gas injection channel 72.

The filter 74 may be installed between the gas pump 73 and the gas valve 71 in a gas flow direction. The filter 74 may be installed in the gas injection channel 72.

The sub-channel may include a body sub-channel 121 provided in (or at) the body 1. The body sub-channel 121 may be formed in (or at) the housing or the lid 114, or be formed between the housing and the lid 114. The body sub-channel 121 may connect the outer sub-channel 7 and a fermentation container sub-channel 18 to each other.

The body sub-channel 121 may communicate with the outer sub-channel 7. The body sub-channel 121 may communicate with the fermentation container sub-channel 18 of the fermentation vessel 10. The body sub-channel 121 may allow the outer sub-channel 7 and the fermentation container sub-channel 18 to communicate with each other between the outer sub-channel 7 and the fermentation container sub-channel 18.

The body sub-channel 121 may be formed in (or at) the lid 114.

When the lid 114 is closed, the body sub-channel 121 may communicate with the fermentation container sub-channel 18. When the lid 114 is opened, the body sub-channel 121 may be separated from the fermentation container sub-channel 18.

Additionally, the sub-channel may include the fermentation container sub-channel 18 formed in (or at) the fermentation vessel 10.

The beer maker may allow water and ingredients contained in the beer brewing space S3 to be mixed together by supplying the water to the ingredients. The water and ingredients may be contained in the fermentation vessel 10.

When the gas pump 73 is driven, gas may be injected into the beer brewing space S3 through the sub-channel. The gas injected by the gas pump 73 may assist the water and ingredients, which are contained in the beer brewing space S3, to be well mixed together.

In the beer maker, the gas pump 73 may be driven in a state in which liquid malt is contained in the beer brewing space S3, and gas pumped by the gas pump 73 may be injected into the beer brewing space S3 through the sub-channel. The gas injected into the beer brewing space S3 may increase the amount of dissolved oxygen in the liquid malt.

The beer maker may be configured such that gas in the beer brewing space S3 is discharged to outside through the outer sub-channel 7. The beer maker may include a gas discharge valve 83 connected to the outer sub-channel 7 to discharge gas in the outer sub-channel 7 to the outside. The gas discharge valve 83 may be connected between the gas valve 71 and the body sub-channel 121 in the sub-channel.

The gas discharge valve 83 may be connected to a pressure sensor connection channel 82 through a gas discharge valve connection channel 85 between a connection part of the outer sub-channel 7 and the gas valve 71.

The gas discharge valve 83 may be opened during a period in which beer is brewed in a state in which the beer brewing space S3 is opened. In this example, the gas in the beer brewing space S3 may be discharged to the outside through the gas discharge valve 83 of the outer sub-channel 7.

When gas is injected by the gas pump 73, the gas discharge valve 83 may be closed. The gas pumped by the gas pump 73 may not be discharged to the outside through the gas discharge valve 83, but may flow to the body sub-channel 121 through the outer sub-channel 7.

Additionally, the beer maker may include a pressure sensor 81 connected to the outer sub-channel 7. The pressure sensor 81 may be connected to the outer sub-channel 7 through the pressure sensor connection channel 82. The pressure sensor 81 may sense a pressure of the beer brewing space S3 by sensing a pressure of the outer sub-channel 7. The outer sub-channel 7 may communicate with the beer brewing space S3 through the body sub-channel 121 and the fermentation container sub-channel 18, and the pressure sensed by the pressure sensor 81 may be used to determine a fermentation degree of beer.

When the gas pump 73 is turned off, the outer sub-channel 7 may guide gas in the beer brewing space S3 to flow toward the gas discharge valve 83. The pressure sensor 81 may sense the pressure of gas flowed from the beer brewing space S3 to the outer sub-channel 7.

A sub-channel relief valve 87 that is opened when the pressure of the outer sub-channel 7 exceeds a set value may be connected to the outer sub-channel 7. The sub-channel relief valve 87 may be connected to the pressure sensor connection channel 82 between the connection part of the outer sub-channel 7 and the body sub-channel 121.

The gas pump 73, the gas injection channel 72, the gas valve 71, and the outer sub-channel 7 may serve as a gas injecting device that injects gas into the beer brewing space S3.

When the gas pump 73 is driven, gas may pass through the outer sub-channel 7, the body sub-channel 121, and the fermentation container sub-channel 18 and then be injected into the beer brewing space S3. The injected gas may assist water and ingredients to be uniformly mixed together, and increase the amount of dissolved oxygen in the liquid malt.

The gas discharge valve 83 and the outer sub-channel 7 may serve as a gas discharging device that discharges gas in the beer brewing space S3 to the outside.

In the beer maker, a fermenting operation (or process) may be divided into primary fermentation and secondary fermentation, and beer ingredients may be fermented in a state in which the gas discharge valve 83 is mainly opened during the primary fermentation. Accordingly, the gas discharge valve 83 can maintain the opened state during the primary fermentation, and the gas in the beer brewing space S3 can be discharged to the outside through the outer sub-channel 7 and the gas discharge valve 83 during the primary fermentation.

The pressure sensor 81 and the outer sub-channel 7 may serve as a pressure sensing device that senses the pressure of the beer brewing space S3.

The gas discharge valve 83 may be opened and then closed so as to sense a fermentation degree during the fermenting process or sense whether the fermentation degree has been completely sensed, and the pressure sensor 81 may sense a change in pressure as the gas discharge valve 83 is opened and then closed. The change in pressure, sensed by the pressure sensor 81, may be used as data for determining a fermentation degree or whether beer has been completely fermented.

The outer sub-channel 7 (of this embodiment) may be a component commonly used in at least two of the gas injecting device, the pressure sensing device, and the gas discharging device.

If all of the gas injecting device, the pressure sensing device, and the gas discharging device have channels independent from one another, the number of parts is increased, and the structure of the beer maker is complicated. However, if the outer sub-channel 7 is commonly used, the number of parts can be minimized, and the beer maker can be compact in size.

The beer maker may include a gas regulating device 15 that regulates gas between the outer vessel 11 and the inner vessel 12. The gas regulating device 15 may be configured to inject gas between the outer vessel 11 and the inner vessel 12.

If gas is injected between the outer vessel 11 and the inner vessel 12 by the gas regulating device, the gas injected between the outer vessel 11 and the inner vessel 12 may pressurize the inner vessel 12, and the inner vessel 12 may be pressurized such that beer in the inner vessel 12 is elevated to the fermentation container main channel 17. The beer elevated from the inner vessel 12 to the fermentation container main channel 17 may flow to the outer main channel 2B through the body main channel 115. The beer flowed to the outer main channel 2B may pass through the beer extraction channel 61 and then be extracted to the outside through the dispenser 62.

When the beer maker includes a gas regulating device 15, the beer maker may extract beer in the beer brewing space S3 to the dispenser 62 in a state in which the lid 114 is not opened.

The gas regulating device 15 may include a pressurization channel connected between the outer vessel 11 and the inner vessel 12, and a pressurizing pump 154 connected to the pressurization channel to supply gas to the pressurization channel.

The pressurization channel may include a body pressurization channel 152 and an outer pressurization channel 153. Additionally, when the fermentation vessel 10 is formed in a double structure of the outer vessel 11 and the inner vessel 12, the pressurization channel may include a fermentation vessel pressurization channel 151. The fermentation vessel pressurization channel 151 may be formed in the fermentation vessel 10, and may communicate between the outer vessel 11 and the inner vessel 12.

The body pressurization channel 152 may be formed in (or at) the body 1. The body pressurization channel 152 may be formed in at least one of the housing and the lid 114.

When the fermentation vessel 10 includes the outer vessel 11 and the inner vessel 12, the body pressurization channel 152 may communicate with the fermentation vessel pressurization channel 151.

When the fermentation vessel 10 is formed in a single structure, the body pressurization channel 152 may communicate between the fermentation vessel 10 and the housing. The body pressurization channel 152 may guide gas in the outer pressurization channel 153 to be supplied between the fermentation vessel 10 and the housing, or may guide gas between the fermentation vessel 10 and the housing to be discharged to the outer pressurization channel 153.

The outer pressurization channel 153 may connect the body pressurization channel 152 and the pressurizing pump 154 to each other.

When the fermentation vessel 10 includes the outer vessel 11 and the inner vessel 12, the pressurizing pump 154 may be driven when the pressure between the outer vessel 11 and the inner vessel 12 is low, and the gas pumped by the pressurizing pump 154 may be supplied between the outer vessel 11 and the inner vessel 12 by passing through the pressurization channel. The gas supplied between the outer vessel 11 and the inner vessel 12 may compress the inner vessel 12 by pressurizing the inner vessel 12, and thus the beer in the beer brewing space S3 can be easily extracted when the main valve 9 and the dispenser 62 are opened.

When the fermentation vessel 10 is formed in the single structure, the pressurizing pump 154 may be driven when the pressure between the fermentation vessel 10 and the housing is low, and the gas pumped by the pressurizing pump 154 may be supplied between the fermentation vessel 10 and the housing by passing through the pressurization channel. The gas supplied between the fermentation vessel 10 and the housing may compress the fermentation vessel 10 by pressurizing the fermentation vessel 10, and thus the beer in the beer brewing space S3 can be easily extracted when the main valve 9 and the dispenser 62 are opened.

The beer maker may include a gas regulating valve 155 connected to the pressurization channel. The gas regulating valve 155 may be connected at the outside of the body 1. The gas regulating valve 155 may be connected to the outer pressurization channel 153. The gas regulating valve 155 may be connected to the outer pressurization channel 153 through a gas regulating valve connection channel 156.

The gas regulating valve 155 may be opened when the inner vessel 12 expands. In this example, the gas between the outer vessel 11 and the inner vessel 12 may pass through the outer pressurization channel 153 and then be discharged through the gas regulating valve 155, to assist the inner vessel 12 to smoothly expand.

In the beer maker, the inner vessel 12 may expand when gas or water is supplied to the beer brewing space S3. The inner vessel 12 may expand while beer is being brewed. The gas regulating valve 155 may be opened when the inner vessel 12 expands as described above.

The gas regulating valve 155 may be closed when the pressurizing pump 154 is driven, and the gas pumped by the pressurizing pump 154 may not be discharged to the outside through the gas regulating valve 155, but may be supplied between the outer vessel 11 and the inner vessel 12 through the pressurization channel.

A pressurization channel relief valve 157 that is opened when the pressure of the outer pressurization channel 153 exceeds a set value may be connected to the outer pressurization channel 153.

The beer maker may include the main valve 9 installed in the main channel 2.

The main valve 9 may be installed between the ingredient supplying device 3 and the body 1. The main valve 9 may be installed among the main valve 2, the connection part 69 of the beer extracting device 6, and the body 1. The main valve 9 may be installed among the main channel 2, the connection part 69 of the beer extracting device 6, and the body main channel 115.

The main valve 9 may open/close the main channel 2. The main valve 9 may be installed in the outer main channel 2B to open/close the outer main channel 2B.

The main valve 9 may be opened when water is supplied to the fermentation vessel 10, to open the main channel 2. The main valve 9 may be closed when the fermentation vessel 10 is cooled, to close the main channel 2. The main valve 9 may open the main channel 2 when ingredients in the ingredient supplying device 3 are supplied to the beer brewing space S3 of the fermentation vessel 10. The main valve 9 may be closed while the ingredients are being fermented, to close the main channel 2. The main valve 9 may be closed when beer is ripened and kept, to close the main channel 2. The main valve 9 may be opened when beer is extracted by the beer extracting device 6, to open the main channel 2.

The beer maker may include a temperature sensor 16 that measures a temperature of the fermentation vessel 10. The temperature sensor 16 may be installed at a position at which the temperature sensor 16 is in contact with the outer vessel 11 when the fermentation vessel 10 is completely inserted into the housing.

The beer maker may include a base 100. The base 100 may form a lower appearance of the beer maker, and support the body 1, the water supply heater 53, the water supply pump 52, the water tank 51, and/or the like, which are located at an upper side thereof.

The beer maker may include a beer container 101 capable of receiving and keeping beer dropping from the dispenser 62. The beer container 101 may be integrally formed with the base 100 or may be coupled to the base 100.

The beer container may include a container body 101A that forms a space in which beer dropping from the dispenser 62 is accommodated. The beer container 101 may include a container top plate 101B at a top surface of the container body 101A to cover the space in the container body 101A.

The container body 101A may protrude forward from a front portion of the base 100. The top surface of the container body 101A may be opened.

Holes 101C through which beer drops into the container body 101A may be provided in the container top plate 101B.

The inner housing 102 may be formed of polystyrene foam and/or the like, which has high heat insulation performance and can absorb vibration.

An inner opening 111A may be at an upper portion of the inner housing 102. The fermentation vessel accommodating space S1, which is a heat insulating space blocked from the outside and accommodates the fermentation vessel 10 therein, may be provided in the inner housing 102 (or at the inner housing 102).

The inner housing 102 may surround a circumferential surface and a bottom surface of the fermentation vessel 10.

Additionally, the fermentation vessel 10 may be inserted into the fermentation vessel accommodating space S1 or be withdrawn to the outside through the inner opening 111A.

The inner opening 111A may be opened in the vertical direction at the upper portion of the inner housing 102.

The inner opening 111A may have a diameter larger than an upper outer surface of the fermentation vessel 10. When the fermentation vessel 10 is mounted in the inner housing 102, the inner opening 111A may surround an upper portion of the fermentation vessel 10.

The inner opening 111A may have a diameter smaller than the upper outer surface of the fermentation vessel 10. The upper portion of the fermentation vessel 10 may be put on surroundings of the inner opening 111A. In this example, the fermentation vessel 10 may open/close the inner opening 111A.

A gap may be formed between an inner circumferential surface 102C of the inner housing 102 and an outer circumferential surface 10A of the fermentation vessel 10. Gas may be filled in the gap. The gas between the inner circumferential surface 102C of the inner housing 102 and the outer circumferential surface 10A of the fermentation vessel 10 may cool or heat the fermentation vessel 10.

The gap between the inner circumferential surface 102C of the inner housing 102 and the outer circumferential surface 10A of the fermentation vessel 10 may be a space in which gas can circulate.

The inner housing 102 may be an assembly of a plurality of members. The inner housing 102 may include a lower inner housing that has an opened top surface and has a space formed therein, and an upper inner housing that is disposed at an upper side of the lower inner housing and has the inner opening 111A formed in (or at) a top surface thereof.

The inner housing 102 may include a bottom plate part to which the fermentation vessel is mounted and supported, and the bottom surface of the fermentation vessel 10 may be mounted on a top surface of the bottom plate part.

A cover opening 111B, through which the fermentation vessel 10 comes in and out, may be provided in the outer cover 104. The cover opening 111B may be provided at an upper portion of the outer cover 104 to be opened in the vertical direction.

The cover opening 111B may have a size smaller than the lid 114, and the lid 114 may open/close the cover opening 111B.

The outer cover 104 may surround the outer circumferential surface of the inner housing 102, and cover a portion of the top surface of the inner housing 102.

The outer cover 104 may be configured as one cover, or the outer cover 104 may be configured as an assembly of a plurality of covers.

The outer cover 104 may include a lower cover 104A that has opened top and bottom surfaces and surrounds the outer circumferential surface of the inner housing 102, and an upper cover 104B that is disposed at an upper side of the lower cover 104A and covers a portion of the top surface of the inner housing 102.

A lower portion of the lower cover 104A may be put on the base 100.

A lower portion of the upper cover 104B may be put on a top end of the lower cover 104A.

The water tank 51 may be spaced apart from the base 100 at an upper side of the base 100. The water tank 51 may be spaced apart from the base 100 in the vertical direction. A space S5 in which at least one of the water supply heater 53 and the water supply pump 52 is accommodated may be provided between the water tank 51 and the base 100. Additionally, the water tank 51 may be spaced apart from the inner housing 51 in the horizontal direction.

The beer maker may include a water tank supporter 106 that supports the water tank 51 such that the water tank 51 is spaced apart from the base 100. The water tank supporter 106 may be disposed at the base 100, and the water tank supporter 106 may support the water tank 51 at the upper side of the base 100 such that the water tank 51 is spaced apart from the base 100. A bottom end of the water tank supporter 106 may be put on the base 100, and the water tank 51 may be put at an upper portion of the water tank supporter 106.

The water tank supporter 106 may include a plurality of supporter members coupled in a hollow cylindrical shape. A side opening may be provided in a surface of the water tank supporter 106, which faces the inner housing 102.

The beer maker may include a water tank protector 107 that is disposed at an upper portion of the water tank 51 to surround an upper outer circumferential surface of the water tank 51. The water tank protector 107 may be disposed to surround the whole or a portion of the upper outer circumferential surface of the water tank 51. The water tank protector 107 may include a plurality of protector members coupled in a ring shape.

The beer maker may include a water tank lid 108 that is coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

The ingredient supplying device 3 may be disposed between the lid 114 and the water tank 51. In this example, the beer maker can be manufactured compact in size as compared with when the ingredient supplying device 3 is not disposed between the lid 114 and the water tank 51, and the ingredient supplying device 3 can be protected by the lid 114 and the water tank 51.

The ingredient supplying device 3 may be spaced apart from the base 100 in the vertical direction at the upper side of the base 100.

The ingredient supplying device 3 may include an accommodating body 36 in which the ingredient accommodating part having the ingredient containers C1 and C2 detachably accommodated therein is formed, and a lid module 37 that covers the ingredient accommodating part.

The lid module 37 may include a supplying device lid 38 that covers the accommodating body 36. The supplying device lid 38 may be slidably disposed at the accommodating body 36 or may be rotatably connected to the accommodating body 36. The supplying device lid 38 may be hinge-connected to the accommodating body 36.

The ingredient supplying device 3 may be disposed at an approximately central upper portion of the beer maker, and the user can easily mount/separate the ingredient containers C1 and C2 by rotating the lid module 37 of the ingredient supply device 3 in the upper direction.

In the beer maker, an accommodating space S6 may be provided in which a plurality of parts are to be accommodated. The accommodating space S6 may be a space between the inner housing 102 and the water tank 51 in the horizontal direction. The accommodating space S6 may be a space between the ingredient supplying device 3 and the base 100 in the vertical direction.

In the beer maker, the plurality of parts are preferably accommodated in the accommodating space S6. In this example, the beer maker can be manufactured compact in size. The plurality of parts accommodated in the accommodating space S6 may be surrounded and protected by the inner housing 102, the water tank 51, the base 100, the ingredient supplying device 3, and a center cover 66.

The opening/closing valves 313 and 323 may be respectively installed at the ingredient supplying device entrance channels 311 and 321 to open/close the ingredient supplying device entrance channels 311 and 321, and the opening/closing valves 313 and 323 may be disposed under the accommodating body 36.

The opening/closing valves 313 and 323 may be installed at a bracket 64 (see FIG. 3) installed at the base 100.

The bracket 64 may be disposed next to the inner housing 102, and the opening/closing valves 313 and 323 may be installed by the bracket 64 to be disposed between the inner housing 102 and the water tank 51. The opening/closing valves 313 and 323 may be disposed between the housing 102 and the water tank 51 in the horizontal direction, and may be disposed between the base 100 and the ingredient supplying device 3 in the vertical direction.

The beer maker may include the center cover 66.

The center cover 66, as shown in FIG. 2, may be disposed to block between the outer cover 104 and the water tank supporter 106 in the horizontal direction and block between the ingredient supplying device 3 and the base 100 in the vertical direction.

Additionally, a front portion of the ingredient supplying device 3 may be put on a top end of the center cover 66, and the ingredient supplying device 3 may be supported by the center cover 66.

The dispenser 62 may be mounted to the center cover 66. The dispenser 62 may protrude toward the front of the center cover 66. The dispenser 62 may be mounted to the center cover 66 to be disposed at an upper side of the beer container 101.

The beer maker may include a controller 109 that controls the beer maker.

The controller 109 may include a main PCB.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beer maker. The input unit may include a rotary knob 109A and a rotary switch 109B switched by the rotary knob 109A. A knob hole 106A through which the rotary knob 109A rotatably passes may be provided at one side of the water tank supporter 106.

The rotary knob 109A may be disposed such that at least one portion of the rotary knob 109A is exposed to outside of the beer maker. The rotary switch 109B may be mounted on the main PCB 109C. The input unit may include a touch screen that receives a command of the user in a touch scheme. The touch screen may be provided in a display 109D, which will be described below. The user may input a command through the remote controller or the wireless communication device, and the controller 109 may receive the command of the user through the wireless communication element.

The controller 109 may include the display 109D that displays various information of the beer maker. The display 109D may include a display element such as LCD, LED, or OLED. The display 109D may include the display PCB on which the display element is mounted. The display PCB may be mounted on the main PCB 109C, or the display PCB may be connected to the main PCB 109C through a separate connector.

The display 109D may display various information related to beer brewing while beer is being brewed. The controller 109 may be connected to the temperature sensor 16. The controller 109 may transmit information on a temperature sensed by the temperature sensor 16 to the display 109D or the wireless communication device. The display 109D or the wireless communication device may display the temperature sensed by the temperature sensor 16 through a numerical value, a graph, and/or the like.

While beer is being brewed, the display 109D may display a completion degree of the beer, an amount of carbonic acid contained in the beer, and/or the like through a numerical value, a graph, and/or the like.

The display 109D may differently display a completion degree of the beer in primary fermentation and a completion degree of the beer in secondary fermentation. The amount of carbonic acid in the beer in the fermentation vessel 10 may gradually increase as time elapses. The controller 109 may detect a pressure in the fermentation vessel 10 through the pressure sensor 72, and detect a temperature of the body 1 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beer after the beer is completely brewed.

If the secondary fermentation, which will be described below, is ended, the controller 109 may determine that the beer has been completely brewed.

The controller 109 may add up at least one of a time at which the micro switch which will be described later is on, a time at which the pressurizing pump 154 is driven, and a time at which the main valve 9 is on after the beer is completely brewed. The controller 109 may calculate an extraction amount of the beer according to the added-up time, and calculate a remaining amount of the beer from the calculated extraction amount. The controller 109 may transmit information on the remaining amount of the beer to the display 109D or the wireless communication device, and at least one of the display 109D and the wireless communication device may display the remaining amount of the beer.

The lid 114 and the fermentation vessel 10 may be described in detail with reference to FIGS. 4 to 6.

The lid 114 may be first described in detail.

The lid 114 may include an outer body 200 and an inner body 210 rotatably disposed at the outer body 200.

The lid 114 may include a channel body 240 in which the body main channel 115 and the body pressurization channel 121 are provided. The channel body 240 may be disposed at a lower portion of the inner body 210. The body pressurization channel 152 may be further formed in the channel body 240.

The outer body 200 may form an appearance of a circumferential surface of the lid 114. The lid 114 may be hinge-connected to the inner housing 102 or the outer cover 104. In this example, the outer body 200 may be hinge-connected to the inner housing 102 or the outer cover 104. The outer body 200 may be provided on a top surface of the outer cover 104. The outer body 200 may be preferably connected to the outer cover 104 by a hinge.

An inner body accommodating space S7, in which the inner body 210 is rotatably accommodated, may be provided in (or at) the outer body 200. The outer body 200 may surround the outer circumference of the inner body 210 accommodated in the inner body accommodating space S7, and protect the outer circumference of the inner body 210.

An inner space S8 in which at least a portion of the channel body 240 is accommodated may be formed in the inner body 210.

The body main channel 115 may be connected to the outer main channel 2B (shown in FIG. 1). A portion of the outer main channel 2B shown in FIG. 1 may be inserted into the inner space S8 to be accommodated in the inner space S8, and may be connected to the body main channel 115 in the inner space S8.

The outer sub-channel 7 shown in FIG. 1 may be connected to the body sub-channel 121. A portion of the outer sub-channel 7 shown in FIG. 1 may be inserted into the inner space S8 to be accommodated in the inner space S8, and the outer pressurization channel 153 may be connected to the body pressurization channel 152 in the inner space S8.

The inner body 210 may be disposed in the inner body accommodating space S7 to rotate about a vertical center axis thereof.

The inner body 210 may include an inner frame 212. The inner frame 212 may be roatably disposed at the inside of the outer body 200. The inner space S8 may be formed at a lower portion of the inner frame 212.

The inner body 210 may include a handle 214 disposed at a top surface of the inner frame 212. The user may hold the handle 214 and rotate the inner body 210 about the vertical center axis of the inner body 210. When the inner body 210 is rotated, the channel body 240 may be rotated together with the inner body 210.

The inner frame 212 may include an inner upper body part 215, an inner lower body part 216, and an outer hollow part 217.

The inner lower body part 216 may protrude from a bottom surface of the inner upper body part 215. The inner lower body part 216 may protrude in a hollow cylindrical shape from the bottom surface of the inner upper body part 215. The inner space S8 may be formed in the inner lower body part 216. The inner space S8 may be provided such that a bottom surface of the inner space S8 is opened in the inner lower body part 216.

The outer hollow part 217 may protrude from the outer circumference of the inner upper body part 215. The outer hollow part 217 may protrude in the lower direction from the outer circumference of the inner upper body part 215. The outer hollow part 217 may be spaced part from the inner lower body part 216. The outer hollow part 217 may be configured as a hollow cylindrical part that is formed larger than the inner lower body part 216. The outer hollow part 217 may be in surface contact with an inner circumferential surface of the outer body 200, and may be supported by the outer body 200.

A channel through-hole 218 through which the outer main channel 2B, the outer sub-channel 7, and the outer pressurization channel 153 pass may be provided in the inner frame 212. The channel through-hole 218 may be a hole through which the outer main channel 2B, the outer sub-channel 7, and the outer pressurization channel 153, extending to the outside in the inner space S8, pass. The channel through-hole 218 may be provided at one side of the inner lower body part 216.

The outer body 200 may include an outer frame 204 and an outer base 206.

The outer base 206 may be coupled to the outer frame 204. An inner body through-hole 205 through which the inner body 210 passes may be formed in the outer base 206.

The outer body 200 may include an inner hollow part 207. The inner hollow part 207 may have a size smaller than that of the outer hollow part 217. The inner hollow part 207 may face the outer hollow part 217. A return spring accommodating space S9 in which a return spring 300 is accommodated may be formed between the inner hollow part 207 and the outer hollow part 217.

The inner hollow part 207 may protrude from a top surface of the outer base 206. The size of the inner hollow part 207 may be smaller the outer hollow part 217 of the inner body 210.

The channel body 240 may be a portion of the body 1, and more particularly, the lid 114.

The channel body 240 may be coupled to the inner frame 212, or may be coupled to an inner lower cover 260 which will be described below. A lower portion of the channel body 240 may protrude in the lower direction of the inner frame 212.

When the lid 114 is closed, a portion of the channel body 240 may be inserted into the opening 111, and may be connected to the fermentation vessel 10.

A plurality of upper channel parts 241, 242, and 246 may protrude from upper portions of the channel body 240. An outer lower channel part 243 may protrude from a lower portion of the channel body 240. An inner lower channel part 244 may protrude from a lower portion of the channel body 240.

The inner lower channel part 244 may be disposed in the outer lower channel part 243 to be spaced apart from the outer lower channel part 243. A gas passage S10, through which gas passes, may be provided between the inner lower channel part 244 and the outer lower channel part 243.

A main communication passage may be provided in the channel body 240 (or at the channel body 240). The main communication passage may allow any first one 241 of the plurality of upper channel parts 241, 242, and 246 and the inner lower channel part 244 to communicate with each other. The first one 241 of the plurality of upper channel parts 241, 242, and 246, the main communication passage, and the inner lower channel part 244 may form the body main channel 115.

When the lid 114 is closed, a lower portion of the inner lower channel part 244 may be connected to an upper portion of the fermentation container main channel 1 formed in the fermentation vessel 10, and the body main channel 115 may communicate with the fermentation container main channel 17 of the fermentation vessel 10.

A sub-communication passage may be provided in the channel body 240. The sub-communication passage may allow another one 242 of the plurality of upper channel parts 241, 242, and 246 and the fermentation container sub-channel 18 to communicate with each other. The another one 242 of the plurality of upper channel parts 241, 242, and 246 and the sub-communication passage may form the body sub-channel 121.

A pressurizing communication passage may be provided in the channel body 240 (or at the channel body 240). The pressurizing communication passage may allow the other one 246 of the plurality of upper channel parts 241, 242, and 246 and the outer lower channel part 243 to communicate with each other. The other one 242 of the plurality of upper channel parts 241, 242, and 246, the pressurizing communication passage, and the outer lower channel part 243 may form the body pressurization channel 152.

When the lid 114 is closed, the fermentation vessel pressurization channel 151 formed in the fermentation vessel 10 may interpolated into the outer lower channel part 243, and the body pressurization channel 152 may communicate with the fermentation vessel pressurization channel 151.

The lid 114 may include the inner lower cover 260. The inner lower cover 260 may be coupled to the inner body 210, and may shield the inner space S8.

The inner lower cover 260 may be coupled to a lower end of the inner lower body part 216. A channel body through-hole through which the channel body 240 is disposed to pass may be formed in the inner lower cover 260.

The lid 114 may include the return spring 300 connected to the outer body 200 and the inner body 210. One end of the return spring 300 may be connected to the outer body 200, and the other end of the return spring 300 may be connected to the inner body 210. The return spring 300 may be configured as a coil spring. If the user holds the handle 214 of the inner body 210 and turns the handle 214, the return spring 300 may be elastically deformed, and a restoring force that allows the inner body 210 to be rotated in the opposite direction may be applied to the inner body 210.

The fermentation vessel 10 may now be described in detail.

The outer vessel 11 may include a tank body 112. The inner vessel accommodating space S4 may be formed in the tank body 112.

The outer vessel 11 may include a top plate 113 formed at an upper portion of the tank body 112.

A through-hole 113A, through which the fermentation container main channel 17, the fermentation vessel pressurization channel 18, and the fermentation vessel pressurization channel 151 pass, may be formed in the outer vessel 11.

When the fermentation vessel 10 is inserted into the housing, the tank body 112 may be disposed in the inner housing 102, and may be surrounded by the inner housing 102.

The outer vessel 11 may be formed in a structure in which the inner vessel 12 is separable from the outer vessel 11.

As an example, in the outer vessel 11, the tank body 112 and the top plate 113 may be separably coupled to each other.

As another example, in the outer vessel 11, the tank body 112 may be configured as an assembly of a plurality of bodies. In this example, the outer vessel 11 may include an upper vessel that is integrally formed with the top plate 113 and has an opened bottom surface, and a lower vessel that is separably coupled to the upper vessel to form the inner vessel accommodating space S4 in which the inner vessel 12 is provided between the lower vessel and the upper vessel.

The top plate 113 may be disposed to block the inner opening 111A when the fermentation vessel 10 is inserted into the housing.

The fermentation vessel 10 may include a sealing body 19 disposed in the through-hole 113A. The sealing body 19 may include a sealing hollow part 191 and a sealing protrusion part 192.

The sealing hollow part 191 may be provided in a hollow cylindrical shape to be inserted into the through-hole 113A.

The sealing protrusion part 192 may protrude from the sealing hollow part 191 and block between the sealing hollow part 191 and the through-hole 113A.

The fermentation vessel 10 may include an inner hollow body 172 in which the fermentation container main channel 17 is provided.

The fermentation container main channel 17 formed in the inner hollow body 172 may be a channel through which water, ingredients, gas, and beer pass.

The fermentation vessel 10 may include an inner vessel joining part 174 at which the inner vessel 12 is joined with the fermentation vessel 10. The inner vessel joining part 174 may protrude from an outer circumferential surface of the inner hollow body 172.

The fermentation vessel 10 may include a tube detachable part 176 at which a flexible tube 20, which will be described below, is detachably coupled to the fermentation vessel 10. The tube detachable part 176 may be formed at an end portion of the inner hollow body 172, which is disposed in the inner vessel 12.

The inner hollow body 172 may be integrally formed with the outer vessel 11. The inner hollow body 172 may be an inner channel body that is formed separately from the outer vessel 11 and is mounted in (or at) the outer vessel 11. That is, the inner hollow body 172 may be an inner channel body formed separately from the outer vessel 11, the inner vessel 12, and an outer hollow body 160.

The fermentation vessel 10 may include a sub-hollow body 183 in which the fermentation container sub-channel 18 is provided. The sub-hollow body 183 may be disposed at the outside of the inner hollow body 172. The sub-hollow body 183 may be disposed side by side with the inner hollow body 172. The fermentation container sub-channel 18 enables gas to pass therethrough, and may be formed in the sub-hollow body 183. The fermentation container sub-channel 18 may be formed long in the sub-hollow body 183 in a length direction of the sub-hollow body 183.

A lower end of the fermentation container sub-channel 18 may be disposed in the beer brewing space S3. Gas passing through the fermentation container sub-channel 18 may be injected into the inner vessel 12. Gas in the beer brewing space S3 may be discharged from the inner vessel 12 by passing through the fermentation container sub-channel 18.

The fermentation vessel 10 may include an outer hollow body 160 disposed at the outside of the inner hollow body 172. The outer hollow body 160 may be disposed to surround the inner hollow body 172. The outer hollow body 160 may be disposed to be inserted into the sealing hollow part 191 of the sealing member 19.

The fermentation vessel pressurization channel 151, through which gas passes, may be formed in the outer hollow body 160. The fermentation vessel pressurization channel 151 may be formed long in the outer hollow body 160 in the length direction of the outer hollow body 160. A plurality of fermentation vessel pressurization channels 151 may be formed in the outer hollow body 160. The plurality of fermentation vessel pressurization channels 151 may be formed in the outer hollow body 160 to be spaced apart from each other in the circumferential direction.

The outer hollow body 160 may be disposed to surround a portion of the outer circumferential surface of the inner hollow body 172. The fermentation vessel pressurization channel 151 may be spaced apart from the inner vessel joining part 174, and gas passing through the fermentation vessel pressurization channel 151 may flow between the outer surface of the inner vessel 12 and the inner surface of the outer surface 11.

The fermentation vessel pressurization channel 151 may be integrally formed with the outer vessel 11. The fermentation vessel pressurization channel 151 may be a separate outer channel body that is formed separately from the outer vessel 11 and is mounted in the outer vessel 11. The outer hollow body 160 may be an outer channel body configured separately from each of the outer vessel 11, the inner vessel 12, the inner hollow body 172, and the sub-hollow body 183.

The fermentation vessel 10 may include the flexible tube 20, which is detachably coupled to the inner hollow body 172. The flexible tube 20 may be connected to a portion of the inner hollow body 172, which is disposed in the inner vessel 12. The flexible tube 20 may allow the fermentation container main channel 17 to extend to an inner lower portion of the inner vessel 12. That is, a portion of the fermentation container main channel 17 may be formed in the inner hollow body 172, and the rest of the fermentation container main channel 17 may be formed in the flexible tube 20.

When the opening of the housing is covered by the lid 114, the body main channel 115 may communicate with the beer brewing space S3 through the fermentation container main channel 17, and the outer main channel 2B shown in FIG. 1, the body main channel 115 shown in FIG. 4, and the fermentation container main channel 17 shown in FIG. 4 may form a channel through which water, ingredients, beer, and gas are to come in and out.

In the beer maker, water, ingredients, and gas can be supplied to the beer brewing space S3 without opening the lid 114, and beer that has been completely fermented can sequentially pass through the fermentation container main channel 17 and the body main channel 115 in the beer brewing space S3 and then be extracted to the outer main channel 2B.

When the opening 111 of the housing is covered by the lid 114, the body sub-channel 121 may communicate with the beer brewing space S3 through the fermentation vessel pressurization channel 18, and the outer sub-channel 7 shown in FIG. 1, the body pressurization channel 121 shown in FIG. 4, and the fermentation container sub-channel 18 shown in FIG. 4 may serve as channels through which gas is to come in and out.

In the beer maker, gas can be injected into the beer brewing space S3 without opening the lid 114, and the gas in the beer brewing space S3 can be discharged to the outer sub-channel 7 through the fermentation container sub-channel 18 and the body sub-channel 121.

When the opening 111 of the housing is covered with the lid 114, the body pressurization channel 152 may communicate between the inner vessel 12 and the outer vessel 11 through the fermentation vessel pressurization channel 151, and the outer pressurization channel 153 shown in FIG. 1, the body pressurization channel 152 shown in FIG. 4, and the fermentation vessel pressurization channel 151 shown in FIG. 4 may serve as channels through which gas is to come in and out.

In the beer maker, gas can be supplied between the outer vessel 11 and the inner vessel 12 without opening the lid 114. The gas supplied between the outer vessel 11 and the inner vessel 12 can assist beer in the inner vessel 12 to be extracted. In the beer maker, when beer is extracted, it is unnecessary to withdraw the fermentation vessel 10 from the housing, and beer can be continuously extracted in the state in which the fermentation vessel 10 is accommodated in the housing.

Figure 7:
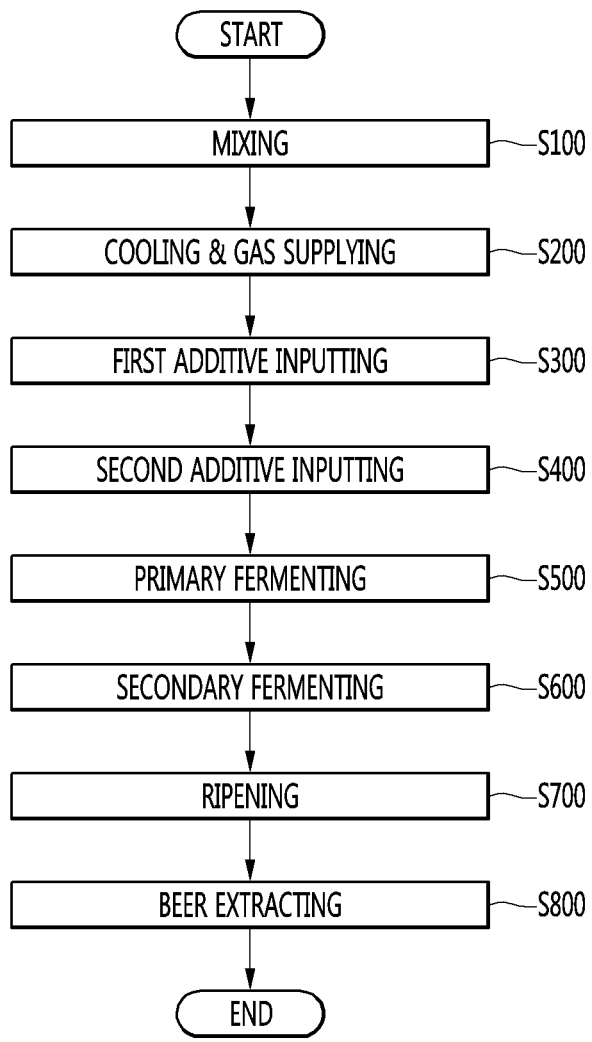
FIG. 7 is a flowchart illustrating a control sequence of the beer maker according to the first embodiment.
Figure 8:
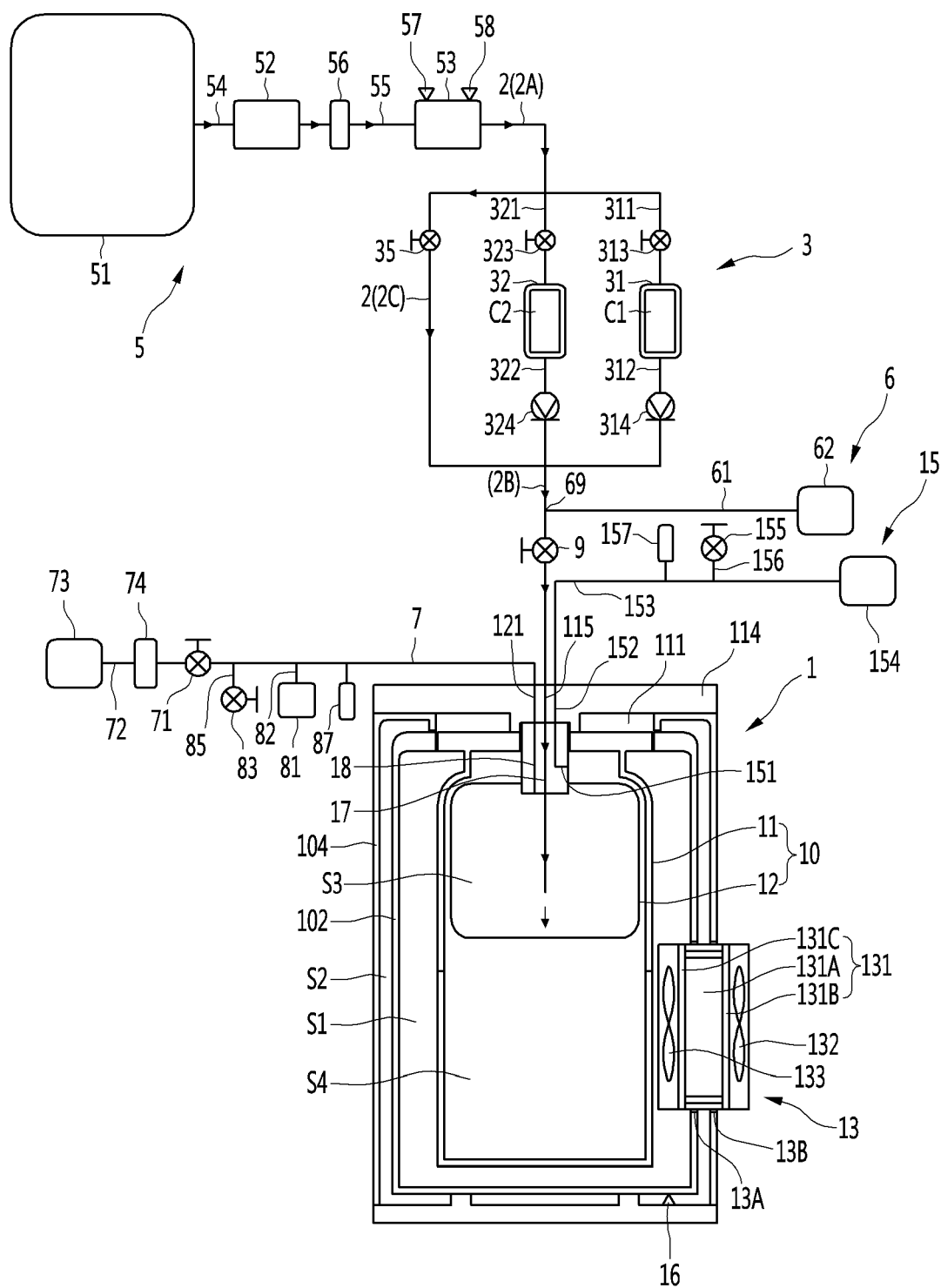
FIG. 8 is a view illustrating water flow when water is supplied into an inner vessel shown in FIG. 1.
Figure 9:
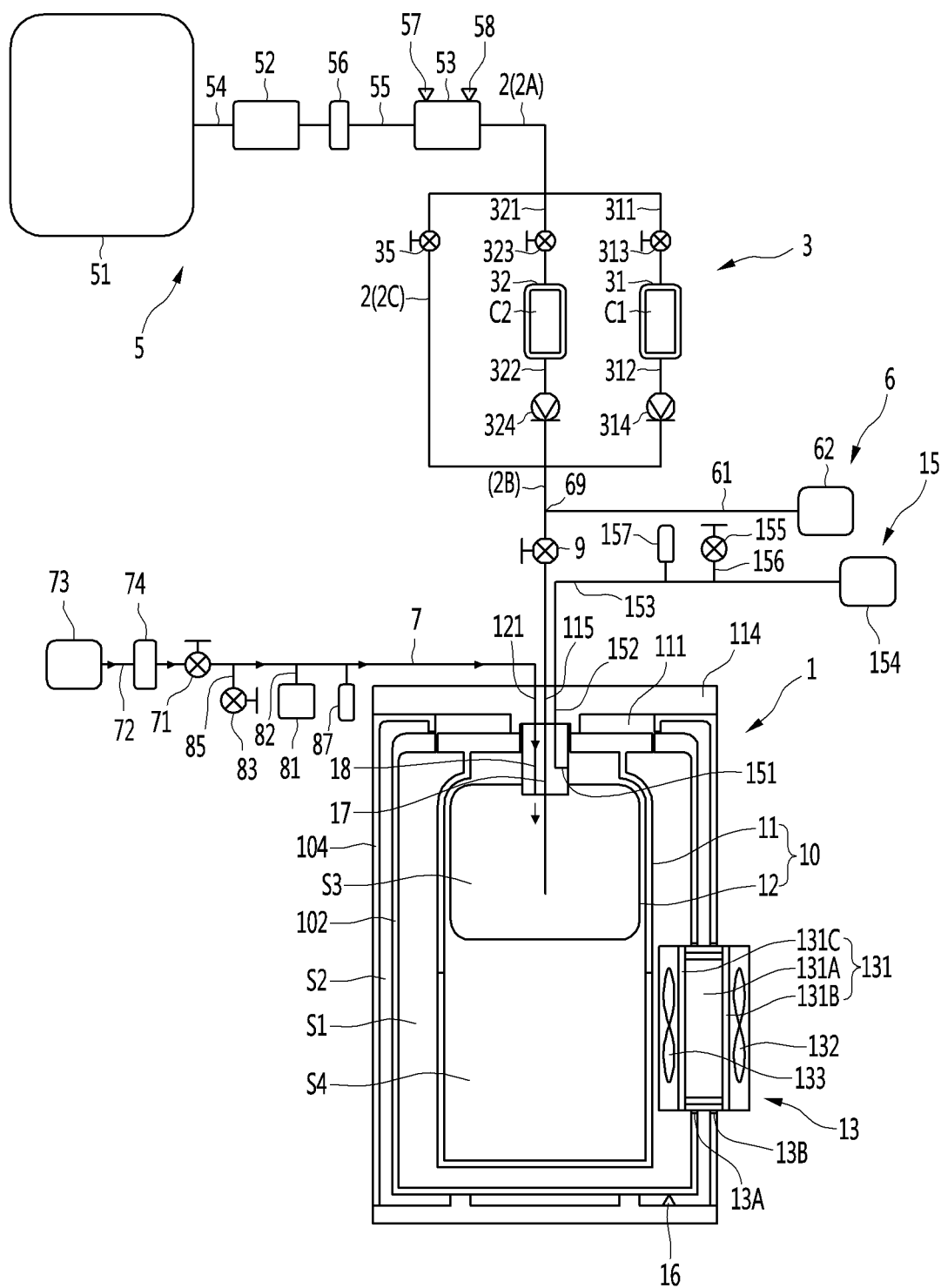
FIG. 9 is a view illustrating gas flow when gas is injected into the inner vessel shown in FIG. 1.
Figure 10:
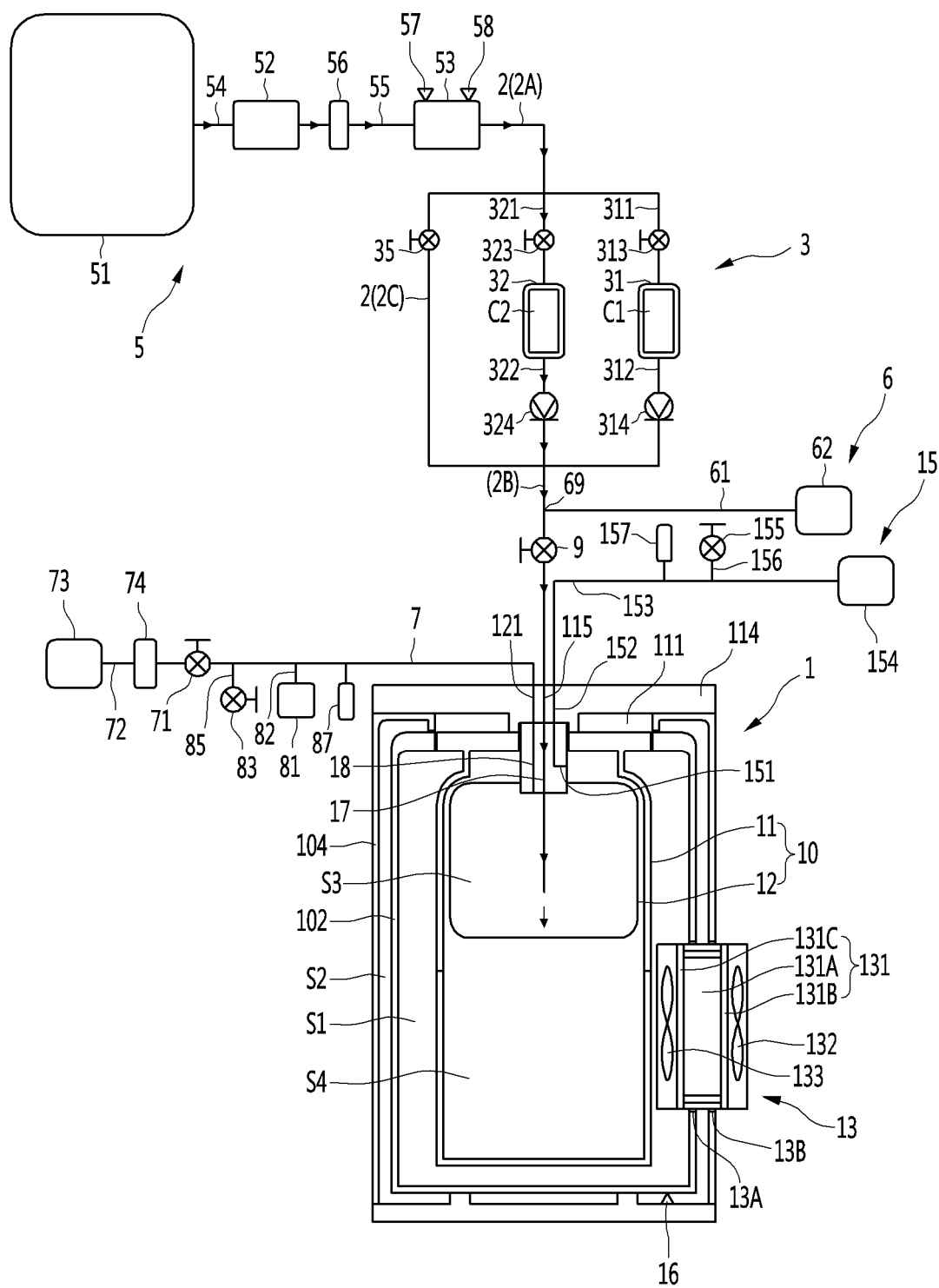
FIG. 10 is a view illustrating additive flow when an additive is supplied into the inner vessel shown in FIG. 1.
Figure 11:
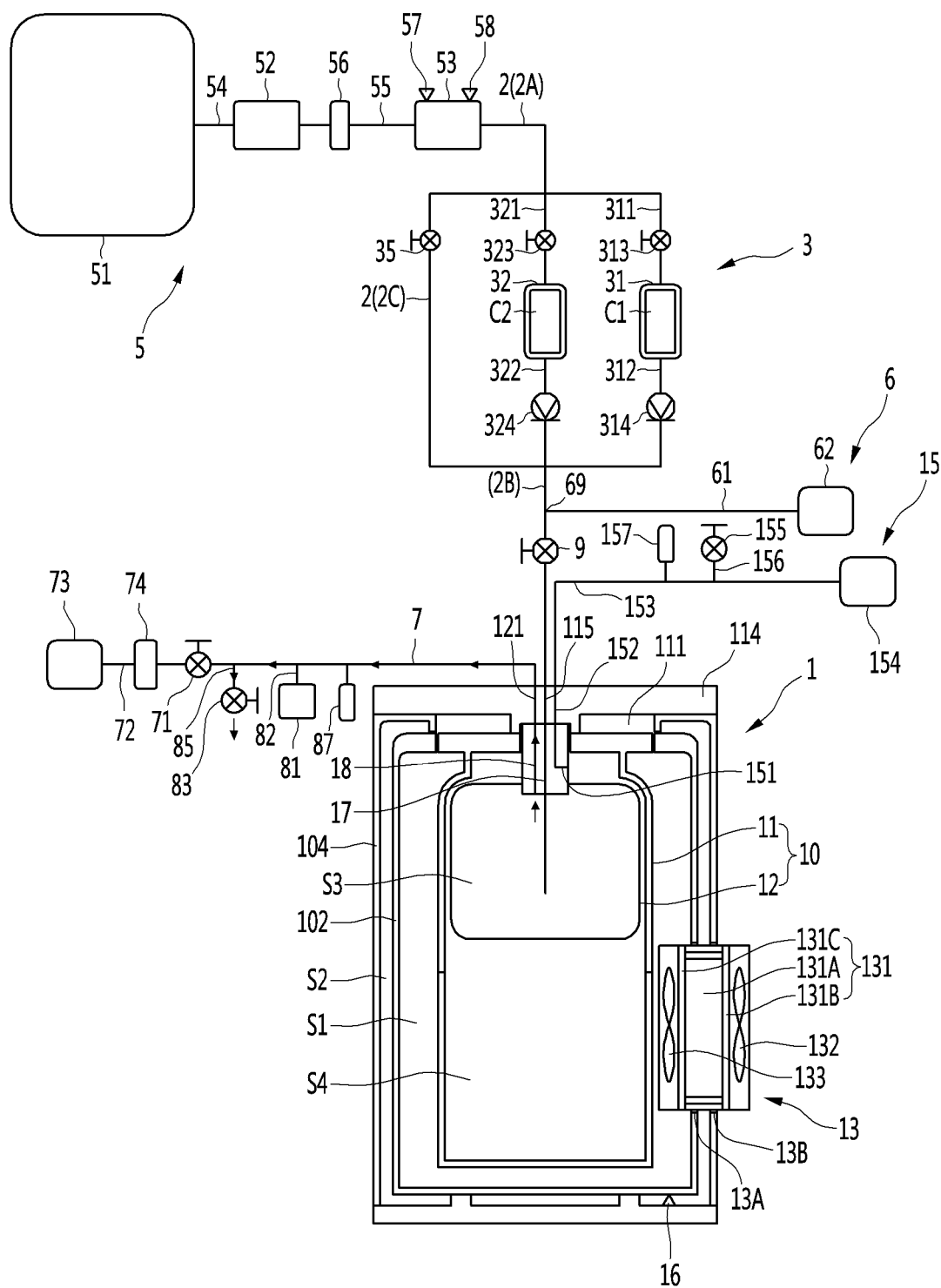
FIG. 11 is a view illustrating gas flow when gas in the inner vessel shown in FIG. 1 is discharged.
Figure 12:
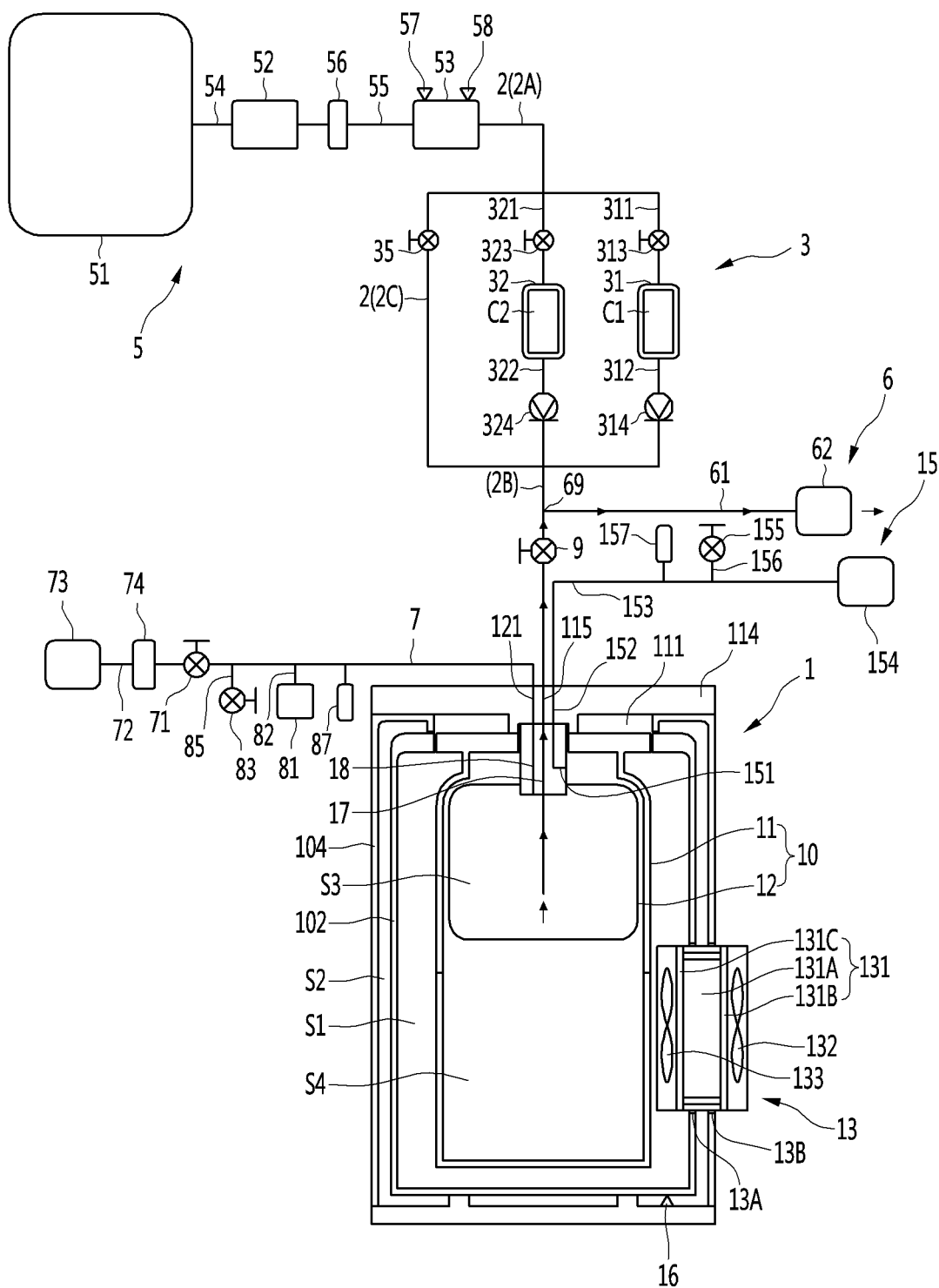
FIG. 12 is a view illustrating beer flow when beer in the inner vessel shown in FIG. 1 is extracted.
Figure 13:
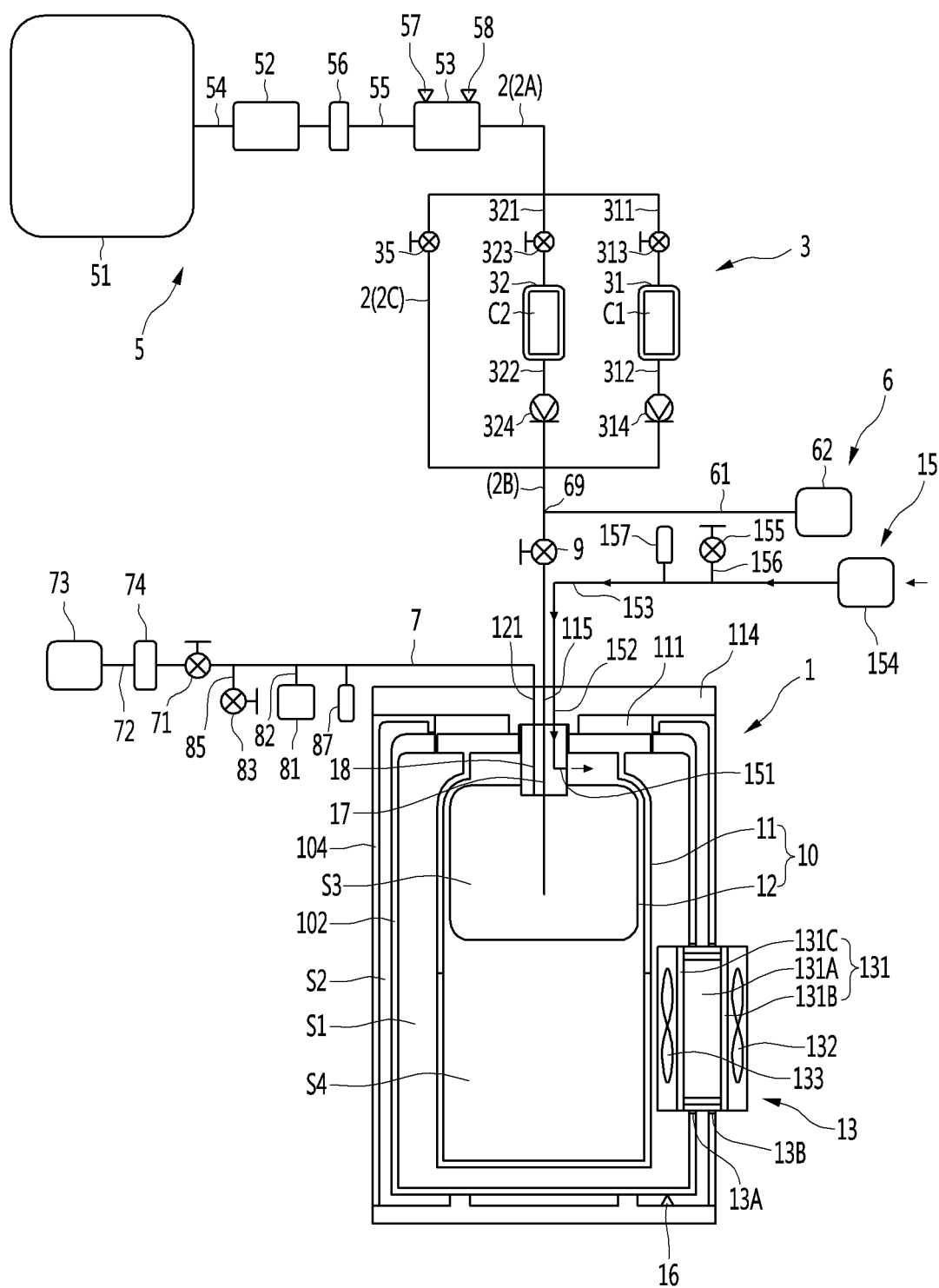
FIG. 13 is a view illustrating gas flow when gas is injected between an outer vessel and the inner vessel, which are shown in FIG. 1.

FIG. 7 is a flowchart illustrating a control sequence of the beer maker according to the first embodiment. FIG. 8 is a view illustrating water flow when water is supplied into the inner vessel shown in FIG. 1. FIG. 9 is a view illustrating gas flow when gas is injected into the inner vessel shown in FIG. 1. FIG. 10 is a view illustrating additive flow when an additive is supplied into the inner vessel shown in FIG. 1. FIG. 11 is a view illustrating gas flow when gas in the inner vessel shown in FIG. 1 is discharged. FIG. 12 is a view illustrating beer flow when beer in the inner vessel shown in FIG. 1 is extracted. FIG. 13 is a view illustrating gas flow when gas is injected between the outer vessel and the inner vessel, which are shown in FIG. 1. Other embodiments and configurations may also be provided.

In order to brew beer, the user may open the lid 114 and insert the fermentation vessel 10 into the housing such that the fermentation vessel 10 is mounted in the housing.

After the fermentation vessel 10 is mounted in the housing, the user may close the lid 114, and the inside of the housing may be closed by the lid 114. In this case, the fermentation vessel 10 may be accommodated and kept between the housing and the lid 114.

Before/after the fermentation vessel 10 is mounted in the housing, the user may insert a plurality of ingredient containers C1 and C2 into the ingredient supplying device 3 and then cover a plurality of ingredient accommodating parts 31 and 32 with the lid module 37.

The user may input a beer brewing command through the input unit provided in the controller 109, the remote controller, or the portable terminal. If the beer brewing command is input, the controller 109 may start beer brewing.

The controller 109 may start a mixing operation (S100) of supplying water to the fermentation vessel 10. The mixing operation (S100) may be a liquid malt forming step of forming liquid malt by uniformly mixing malt in the fermentation vessel 10 with hot water.

In the mixing operation (S100), the controller 109 may turn on the water supply pump 52 and the water supply heater 53, turn on the bypass valve 35, and turn on the main valve 9. The controller 109 may open the main valve 9 by turning on the main valve 9 that is in a turn-off state. In the mixing operation (S100), the controller 109 may maintain the first opening/closing valve 313 and the second opening/closing valve 323 to be turned off.

Referring to FIG. 8, water in the water tank 51 may be discharged from the water tank 51 to pass through the water supply pump 52, and flow to the water supply heater 53 to be heated by the water supply heater 53. The water heated by the water supply heater 53 may pass through the supply channel 2A, the bypass valve 35, and the bypass channel 2C, and pass through the main valve 9. The hot water passing through the main valve 9 may sequentially pass through the body main channel 115 and the fermentation container main channel 17 and then be introduced into the beer brewing space S3 of the fermentation vessel 10.

The hot water introduced into the beer brewing space S3 of the fermentation vessel 10 may be mixed with malt that has already been accommodated in the beer brewing space S3, and the malt in the beer brewing space S3 may be mixed with water to be gradually diluted. The malt that has already been accommodated in the fermentation vessel 10 can be rapidly and uniformly mixed with the hot water supplied through the main channel 2.

In the above-described mixing operation (S100), the water supply heater 53 preferably heats water to 50° C. to 70° C., and the controller 109 may control the water supply heater 53 according to a temperature sensed by the thermistor 57.

The beer maker may perform the above-described mixing operation (S100) until a flow rate sensed by the flow meter 56 reaches a set flow rate. If the flow rate sensed by the flow meter 56 reaches the set flow rate, the mixing operation (S100) may be ended.

When the mixing operation (S100) is ended, the controller 109 may turn off the water supply pump 52 and the water supply heater 53, and turn off the bypass valve 35.

The beer maker may be controlled such that gas is introduced into the inner vessel 12 during the above-described mixing operation S100.

The controller 109 may allow water to be primarily introduced into the beer brewing space S3 and then stop the primary water introduction. Subsequently, the controller 109 may inject gas into the beer brewing space S3 and then stop the gas injection. The controller 109 may allow water to be secondarily introduced into the beer brewing space S3 and then stop the secondary water introduction. The controller 109 may sequentially perform the primary water introduction, the gas injection, and the secondary water introduction and then end the mixing operation (S100).

In the primary water introduction and the secondary water introduction, the controller 109, as described above, may turn on the water supply pump 52 and the water supply heater 53, and open the bypass valve 35 and the main valve 9.

In the gas injection between the primary water introduction and the secondary water introduction, the controller 109 may drive the gas pump 73, and open the gas valve 71. When the gas pump 73 is driven and the gas valve 71 is opened, the gas discharge valve 83 may be maintained in a close state.

When the gas pump 73 is driven and the gas valve 71 is opened, external gas may be introduced into the gas injection channel 72 by the gas pump 73, and the gas of the gas injection channel 72 may sequentially pass through the gas valve 71 and the outer sub-channel 7. The gas passing through the outer sub-channel 7 may sequentially pass through the body sub-channel 121 and the fermentation container sub-channel 18 and then be injected into the beer brewing space S3. The gas injected into the beer brewing space S3 can assist water and ingredients to be mixed together.

If the mixing operation (S100) is ended, the beer maker may perform a cooling and gas supplying operation (S200) of cooling the fermentation vessel 10.

The controller 109 may turn on the temperature regulating device 13 so as to cool the fermentation vessel 10. When the temperature regulating device 13 is turned on, gas between the housing and the fermentation vessel 10 may be cooled by the temperature regulating device 13, the fermentation vessel 10 accommodated in the housing may be cooled, and the liquid malt accommodated in the inner vessel 12 may be cooled.

When the inside of the housing is cooled as described above, the beer maker may cool the fermentation vessel 10 to a middle temperature (e.g., 23° C. to 27° C.), and the controller 109 may control the temperature regulating device 13 according to a temperature sensed by the temperature sensor 16. If the temperature sensed by the temperature sensor 16 exceeds an on-temperature, the controller 109 may turn on the temperature regulating device 13. If the temperature sensed by the temperature sensor 16 is equal to or smaller than an off-temperature, the controller 109 may turn off the temperature regulating device 13.

In the above-described cooling and gas supplying operation (S200), the beer maker inject gas into the inner vessel 12 of the fermentation vessel 10. In the cooling and gas supplying operation (S200), the gas injected into the inner vessel 12 may supply oxygen to the liquid malt.

The beer maker may inject the gas into the beer brewing space S3 from when the cooling and gas supplying operation (S200) is started. The beer maker may inject the gas into the beer brewing space S3 after a set time elapses from when the cooling and gas supplying operation (S200) is started. The beer maker may inject the gas into the beer brewing space S3 if the temperature sensed by the temperature sensor 16 is decreased at least once to the off-temperature or less after the cooling and gas supplying operation (S200) is started.

The controller 109 may turn on the gas pump 73 and turn off the gas valve 71. In the cooling and gas supplying operation S200, the controller 109 may allow the main valve 9 to be maintained in the close state. In the cooling and gas supplying operation S200, the controller 109 may allow the gas discharge valve 83 to be maintained in the close state.

During a period in which the gas pump 73 is turned on and the gas valve 71 is turned off, the gas pumped by the gas pump 73, as shown in FIG. 9, may sequentially pass through the gas valve 71 and the outer sub-valve 7 through the gas injection channel 72. The gas passing through the outer sub-channel 7 may sequentially pass the body sub-channel 121 and the fermentation container sub-channel 18 and then be injected into the inner vessel 12. The gas injected into the inner vessel 12 may be bumped with the liquid malt to supply oxygen to the liquid malt.

The controller 109 may apply the gas to the liquid malt during a mixing set time (e.g., 1 hour) after the gas pump 73 is turned on. If the mixing set time elapses after the gas pump 73 is turned on, the controller 109 may turn off the gas pump 73, and allow the gas valve 71 to be closed.

After the cooling and gas supplying operation (S200), the beer maker may perform additive inputting operations (S300 and S400).

In the additive inputting operations (S300 and S400), the beer maker may simultaneously or sequentially input an additive of the first ingredient container C1 and an additive of the second ingredient container C2.

The controller 109 may sequentially perform an operation (S300) (or process) of inputting the additive of the first ingredient container C1 and an operation (S400) of inputting the additive of the second ingredient container C2.

In the operation (S300) of inputting the additive of the first ingredient container C1, the controller 109 may turn on the water supply pump 52, the main valve 9, and the first opening/closing valve 313 for a first additive set time. When the water supply pump 52 is turned on, water in the water tank 51 may pass through the water supply pump 52 and then pass through the water supply heater 53, and be introduced into the first ingredient container C1. The water introduced into the first ingredient container C1 may be mixed with the additive accommodated in the first ingredient container C1, be flowed to the main channel 2B together with the additive provided in the first ingredient container C1, and pass through the main valve 9. The additive passing through the main valve 9 may sequentially pass through the body main channel 115 and the fermentation container main channel 17 and then be introduced into the beer brewing space S3 to be mixed with the liquid malt.

If the first additive set time elapses, the controller 109 may turn off the water supply pump 52 and the first opening/closing valve 313, and end the process (S300) of inputting the additive of the first ingredient container C1.

In the operation (S400) of inputting the additive of the second ingredient container C2, the controller 109 may turn on the water supply pump 52 and the second opening/closing valve 323 for a second additive set time. When the water supply pump 52 is turned on, water in the water tank 51 may pass through the water supply pump 52 and then pass through the water supply heater 53, and be introduced into the second ingredient container C2. The water introduced into the second ingredient container C2 may be mixed with the additive accommodated in the second ingredient container C2, flow to the outer main channel 2B together with the additive provided in the second ingredient container C2, and pass through the main valve 9. The additive passing through the main valve 9 may sequentially pass through the body main channel 15 and the fermentation container main channel 17 and then be introduced into the beer brewing space S3 of the fermentation vessel 10 to be mixed with the liquid malt. If the second additive set time elapses, the controller 109 may turn off the water supply pump 52 and the second opening/closing valve 323, and end the operation (S400) of inputting the additive of the second ingredient container C2.

If both of the additive inputting operations (S300 and S400) are ended, the beer maker may perform fermenting operations (S500 and S600) of fermenting ingredients in the fermentation vessel 10.

The fermenting operations (S500 and S600) may include a primary fermenting operation (S500) and a secondary fermenting operation (S600).

In the fermenting operations (S500 and S600), alcohol and carbon dioxide may be simultaneously generated from the ingredients in the beer brewing space S3. In the fermenting operations (S500 and S600), the beer maker may first perform the primary fermenting operation (S500) in which the alcohol (ethanol) is first generated, and the carbon dioxide is not collected. The beer maker may perform the secondary fermenting operation (S600) in which the carbon dioxide is first generated and collected after the primary fermenting operation (S500).

The beer maker may self-determine whether the primary fermenting operation (S500) has been ended and self-determine whether the secondary fermenting operation (S600) has been ended, using a pressure sensed by the pressure sensor 81 and opening/closing of the gas discharge valve 83.

In the primary fermenting operation (S500), the controller 109 may control the temperature regulating device 13 to a primary fermentation target temperature, and control the temperature regulating device 13 such that the temperature sensed by the temperature sensor 16 maintains a primary fermentation set temperature range.

The primary fermenting operation (or process) may include an open fermenting process in which the fermentation of beer is performed while the gas in the beer brewing space S3 is discharged to the outside, and a close fermenting operation in which the fermentation of beer is performed in a state in which the gas in the beer brewing space S3 is not discharged to the outside.

The open fermenting process of the primary fermenting operation is a process in which the opening of the gas discharge valve 83 is maintained for an open set time, and the close fermenting process of the primary fermenting process is a process in which the closing of the gas discharge valve 83 is maintained for a close set time.

In the opening fermenting process of the primary fermenting operation, if the gas discharge valve 73 is opened, the gas in the beer brewing space S3, as shown in FIG. 11, may sequentially pass through the fermentation container sub-channel 18 and the body sub-channel 121 and then be introduced into the outer sub-channel 7, and be discharged to the outside from the outer sub-channel 7 by passing through the gas discharge valve 83.

In the primary fermenting process, the open fermenting operation may be first performed, and the close fermenting process may be performed after the open fermenting process. In the primary fermenting operation, the open fermenting process and the close fermenting process may be alternately performed as time elapses.

In the close fermenting process, the gas discharge valve 83 may be closed, and the gas in the beer brewing space S3 may not flow to the gas discharge valve 83.

In the beer maker, the pressure sensor 81 may sense a pressure during the primary fermenting operation, and the end of the primary fermenting operation may be detected according to the pressure sensed by the pressure sensor 81.

The beer maker may determine whether the primary fermenting operation has been ended according to the pressure sensed by the pressure sensor 81 during the close fermenting process.

If the primary fermenting operation (S500) is ended, the controller 109 may start the secondary fermenting operation (S600).

In the secondary fermenting operation (S600), the controller 109 may control the temperature regulating device 13 to a second fermentation target temperature, and control the temperature regulating device 13 such that the temperature sensed by the temperature sensor 16 maintains a secondary fermentation set temperature range.

In the secondary fermenting process (S600), beer may be fermented in a state in which the pressure in the beer brewing space S3 is maintained to a set pressure range.

The controller 109 may open/close the gas discharge valve 83 while comparing the pressure sensed by the pressure sensor 81 with a set pressure, and maintain the pressure in the beer brewing space S3 to the set pressure range.

In the secondary fermenting operation (S600), if the pressure sensed by the pressure sensor 81 exceeds the set pressure, the gas discharge valve 83 may be opened. If the pressure sensed by the pressure sensor 81 is equal to or smaller than the set pressure, the gas discharge valve 83 is closed.

Like the primary fermenting operation, the gas in the beer brewing space S3 is discharged to the outside when the gas discharge valve 83 is opened. Therefore, a detailed description regarding this will be omitted.

In the secondary fermenting operation (S600), the ingredients may be additionally fermented as it is determined whether the fermentation of beer has been ended, using a set time (e.g., 12 hours or 24 hours) as a period.

In the secondary fermenting operation (S600), the close fermenting process and the open fermenting process may be repeated as time elapses. As the fermentation of beer is continued, the number of times of performing the open fermenting process is gradually decreased.

In order to determine a point of time when the secondary fermenting operation (S700) is ended, the controller 109 may count a number of times of opening the gas discharge valve 83. If the gas discharge valve 83 is not opened for a set time or if the number of times of opening the gas discharge valve 83 is less than a set number of times, the controller 109 may self-determine that the secondary fermenting operation (S600) has been ended.

The controller 109 may determine whether the secondary fermenting operation has been ended according to a number of times of performing the open fermenting process for the set time.

If the number of times of opening the gas discharge valve 83 is less than the set number of times for the set time, the fermenting operations (S500 and S600) may be ended.

After the fermenting operations (S500 and S600) are ended, the beer maker may perform a ripening operation (S700). If the secondary fermenting operation (S600) is ended, the ripening operation (S700) may be performed.

The ripening step (S700) may be performed for a ripening set time. The ripening operation (S700) may be ended if the ripening set time elapses.

The controller 109 may control the temperature regulating device 13 such that the temperature of beer is maintained between upper and lower limit values of a ripening set temperature for the ripening set time.

If the temperature sensed by the temperature sensor 16 is equal to or smaller than the lower limit value of the ripening set temperature, the controller 104 may turn off the temperature regulating device 13. If the temperature sensed by the temperature sensor 16 is equal to or larger than the upper limit value of the ripening set temperature, the controller 109 may turn on the temperature regulating device 13.

If the ripening set time elapses, the beer maker may end the beer brewing.

The controller 109 may display that the beer brewing has been ended through the display 109D or the like. The user may perform an extracting operation (S800) of extracting beer by manipulating the dispenser 62.

The user may manipulate the dispenser 62 to be opened, and the controller 109 may detect the manipulation of the dispenser 62 to be opened according to a contact point of the micro switch of the dispenser 62.

Since the beer brewing has been ended, the controller 109 may open the main valve 9.

When the main valve 9 is opened, the beer in the beer brewing space S3 may sequentially pass through the fermentation container main channel 17 and the body main channel 115 and be introduced into the outer main channel 2B by the pressure of the gas between the inner vessel 12 and the outer vessel 11. The beer flowing to the outer main channel 2B may flow to the beer extraction channel 61 by passing through the main valve 9, and be extracted to the outside through the dispenser 62 in an open state.

If the user partially extracts the beer through the dispenser 62 and then manipulates the dispenser 62 to be closed, the contact point of the micro switch may be released, and the controller 109 may close the main valve 9.

While the beer is being extracted or after the beer is extracted, the controller 109 may turn on/off the pressurizing pump 154 according to a pressure sensed by the pressure sensor 1.

If the pressure sensed by the pressure sensor 81 is equal to or smaller than a set pressure, the controller 109 may turn on the pressurizing pump 154.

When the gas pump 152 is turned on, gas, as shown in FIG. 13, may pass through the outer pressurization channel 153, and sequentially pass through the body pressurization channel 152 and the fermentation vessel pressurization channel 151 from the outer pressurization channel 153. The gas passing through the fermentation vessel pressurization channel 151 may be supplied between the inner vessel 12 and the outer vessel 11. The gas supplied between the inner vessel 12 and the outer vessel 11 may pressurize the inner vessel 12. The gas may pressurize the inner vessel 12 with a pressure with which the beer in the inner vessel 12 can be elevated to the main channel 2.

This may be provided for the purpose of forming the pressure between the inner vessel 12 and the outer vessel 11 to a sufficiently high pressure such that the beer in the beer brewing space S3 can be smoothly and rapidly extracted.

If the pressure sensed by the pressure sensor 81 exceeds the set pressure as the pressurizing pump 154 is turned on, the controller 109 may turn off the pressurizing pump 154.

If the beer in the beer brewing space S3 is completely extracted, the user may open the lid 114 so as to withdraw the fermentation vessel 10 from the housing. That is, the user may withdraw, to the outside, the fermentation vessel that has already been used in the housing.

The user may insert a new fermentation vessel 10 into the housing to be accommodated in the housing and then additionally brew new beer through the above-described processes.

When the beer brewing is completed, the user may withdraw the fermentation vessel 10 from the housing. In this example, the inner vessel 12 may be carried in a state in which the inner vessel 12 is protected by the outer vessel 11. Additionally, the beer in the inner vessel 12 may be carried a long distance while minimizing the pollution of beer, caused by damage of the inner vessel 12.

Figure 14:
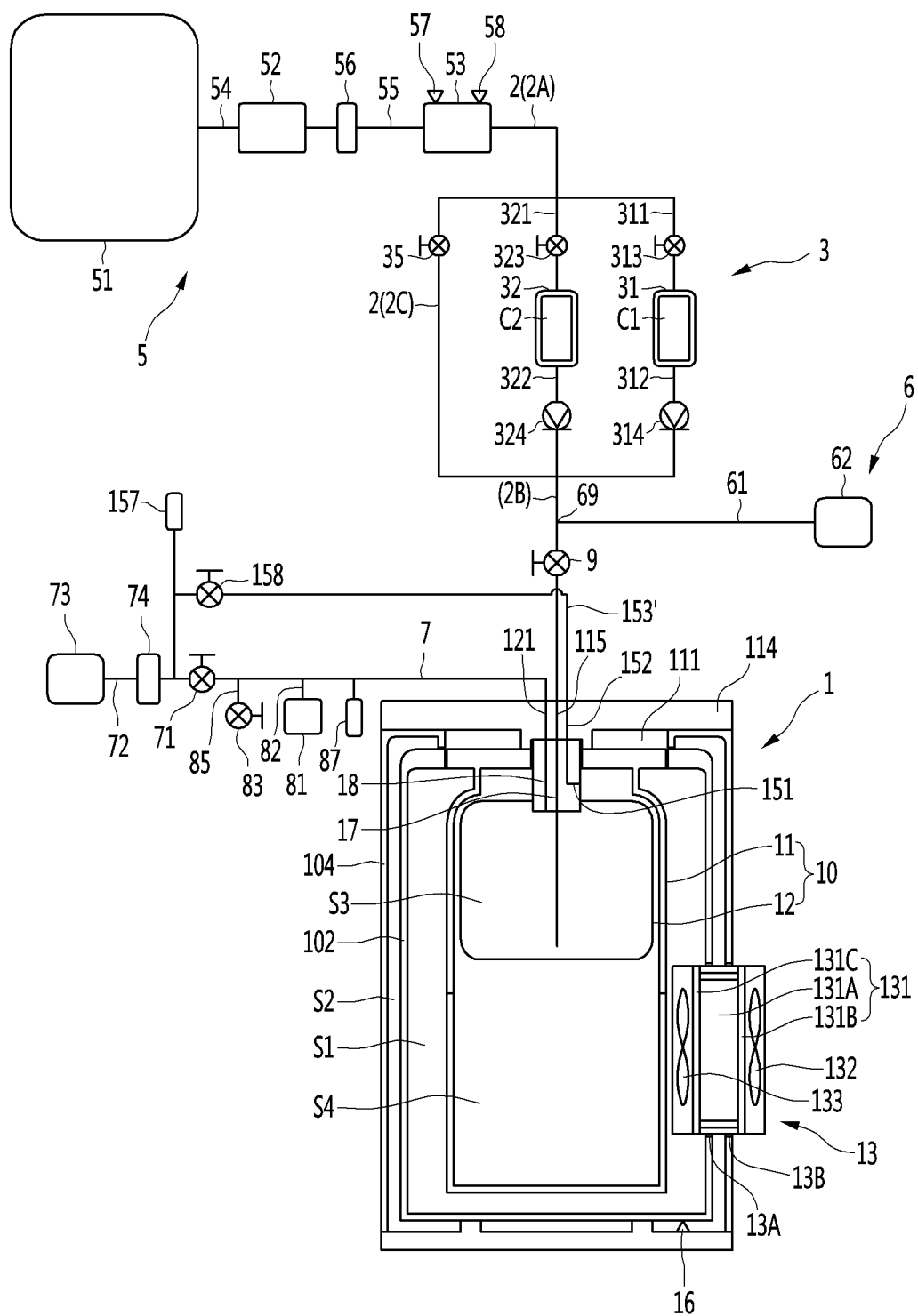
FIG. 14 is a view illustrating a configuration of a beer maker according to a second embodiment.
Figure 15:
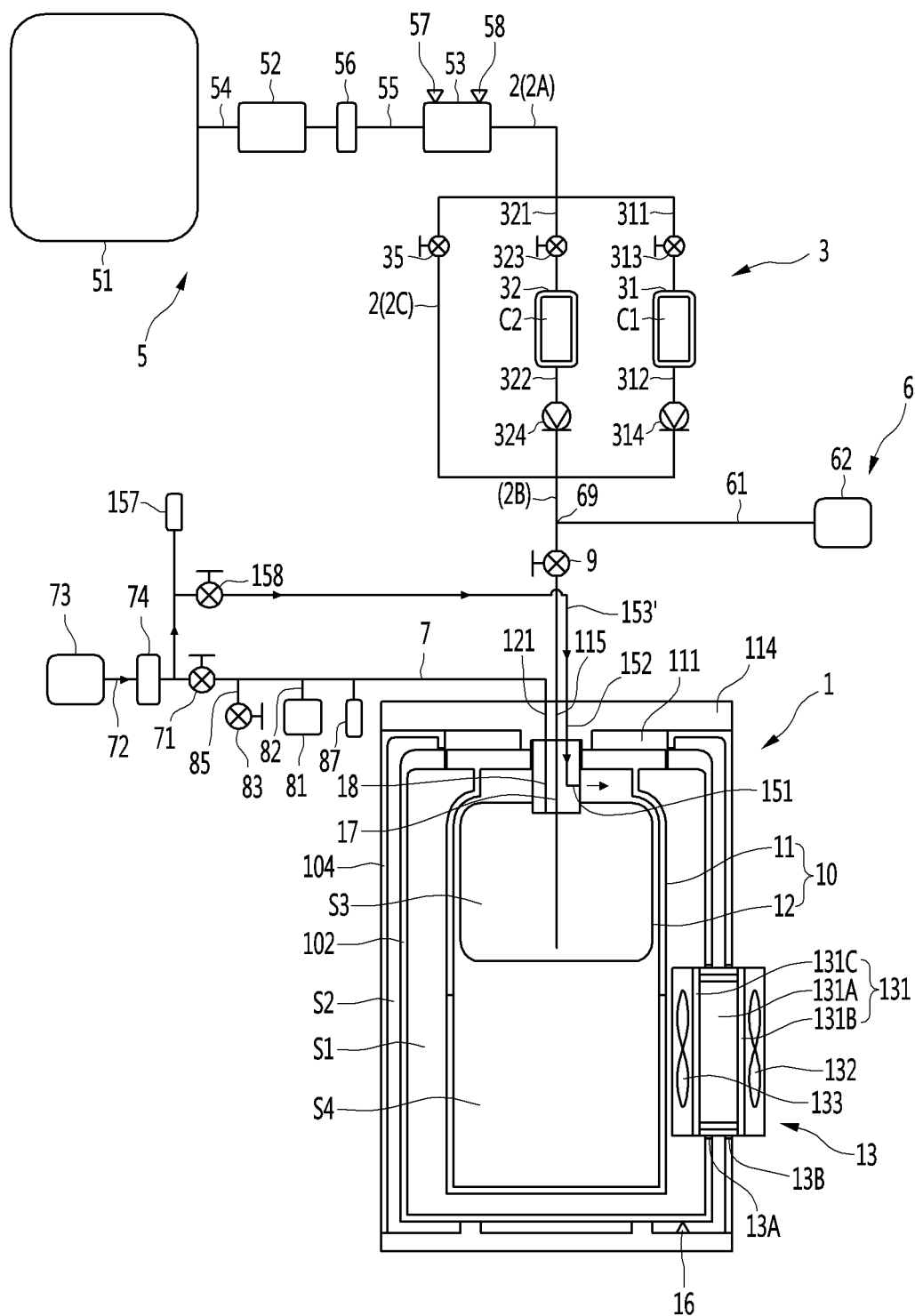
FIG. 15 is a view illustrating gas flow when a gas pump supplies gas between an inner vessel and an outer vessel according to the second embodiment.

FIG. 14 is a view illustrating a configuration of a beer maker according to a second embodiment. FIG. 15 is a view illustrating gas flow when a gas pump supplies gas between an inner vessel and an outer vessel according to the second embodiment. Other embodiments and configurations may also be provided.

Referring to FIGS. 14 and 15, in the beer maker (of this embodiment), a pressurization channel may be connected to the sub-channel, and the gas pump 73 may serve as the pressurizing pump 154 of the first embodiment. The pressurization channel of this embodiment may be connected to the gas injection channel 72.

In this embodiment, other components and operations except that the pressurization channel is connected to the sub-channel are identical or similar to those of the first embodiment. Therefore, the components are designated by like reference numerals, and their detailed descriptions may be omitted.

The pressurization channel (of this embodiment) may include the fermentation pressurization channel 151 that is formed in the fermentation vessel 10 and communicates between the outer vessel 12 and the inner vessel 11, the body pressurization channel 152 that is formed in the body 1 and communicates with the fermentation vessel pressurization channel 151, and an outer pressurization channel 153' that connects the body pressurization channel 152 and the gas injection channel 72.

In this embodiment, the fermentation vessel pressurization channel 151 and the body pressurization channel 152 are identical to those of the first embodiment, and therefore, their detailed descriptions may be omitted.

One end of the outer pressurization channel 153' may be connected to the gas injection channel 72, and the other end of the outer pressurization channel 153' may be connected to the body pressurization channel 152.

A pressurization channel relief valve 157 that is opened when the pressure of the outer pressurization channel 153' exceeds a set value may be connected to the outer pressurization channel 153'.

The beer maker may further include a pressurizing valve 158 installed in the outer pressurization channel 153'. An operation of the pressurizing valve 158 may be controlled opposite to that of the gas valve 71. When the gas valve 71 is opened, the pressurizing valve 158 may be closed. When the gas valve 71 is closed, the pressurizing valve 158 may be opened. The pressurizing valve 158 may be opened only when gas for extracting beer is supplied, and be closed during the mixing step (S100), the cooling and gas supplying operation (S200), the additive inputting operations (S300 and S400), the fermenting operations (S500 and S600), and the ripening operation (S700).

The gas pump 73 (of this embodiment) may be driven in the beer extracting operation (S800) in addition to the mixing operation (S100) and the cooling and gas supplying operation (S200).

The controller 109 may turn on/off the gas pump 73 according to a pressure sensed by the pressure sensor 81 while beer is being extracted or after the beer is extracted.

If the pressure sensed by the pressure sensor 81 is equal to or smaller than a set pressure, the controller 109 may turn on the gas pump 73. In this example, the pressurizing valve 158 may be opened, and the gas valve 71 may be maintained in the close state.

When the gas pump 73 is turned on, as shown in FIG. 15, gas may be pumped to the gas injection channel 72, and be introduced into the outer pressurization channel 153' from the gas injection channel 72. The gas introduced into the outer pressurization channel 153' may sequentially pass through the body pressurization channel 152 and the fermentation vessel pressurization channel 151. The gas passing through the fermentation vessel pressurization channel 151 may be supplied between the inner vessel 12 and the outer vessel 11. The gas supplied between the inner vessel 12 and the outer vessel 11 may pressurize the inner vessel 12. The gas may pressurize the inner vessel 12 with a pressure with which beer in the inner vessel 12 can be elevated to the body main channel 115.

If the pressure sensed by the pressure sensor 81 exceeds a set pressure as the gas pump 73 is turned on, the controller 109 may turn off the gas pump 73.

In this embodiment, one gas pump 73 can inject gas into the beer brewing space S3 formed in the inner vessel 12, and inject gas between the inner vessel 12 and the outer vessel 11. In this embodiment, the number of pumps can be minimized as compared with the first embodiment. Further, the structure of the beer maker can be simplified, and the beer maker can be manufactured compact in size.

In this embodiment, each of the gas valve 71 and the pressurizing valve 158 may be configured as a separate opening/closing valve, and include one three-way valve capable of performing functions of the gas valve 71 and the pressurizing valve 158. In this example, the three-way valve may include an entrance part connected to the gas injection channel 72, a first exit part connected to the outer sub-channel 7, and a second exit part connected to the outer pressurization channel 153'.

Figure 16:
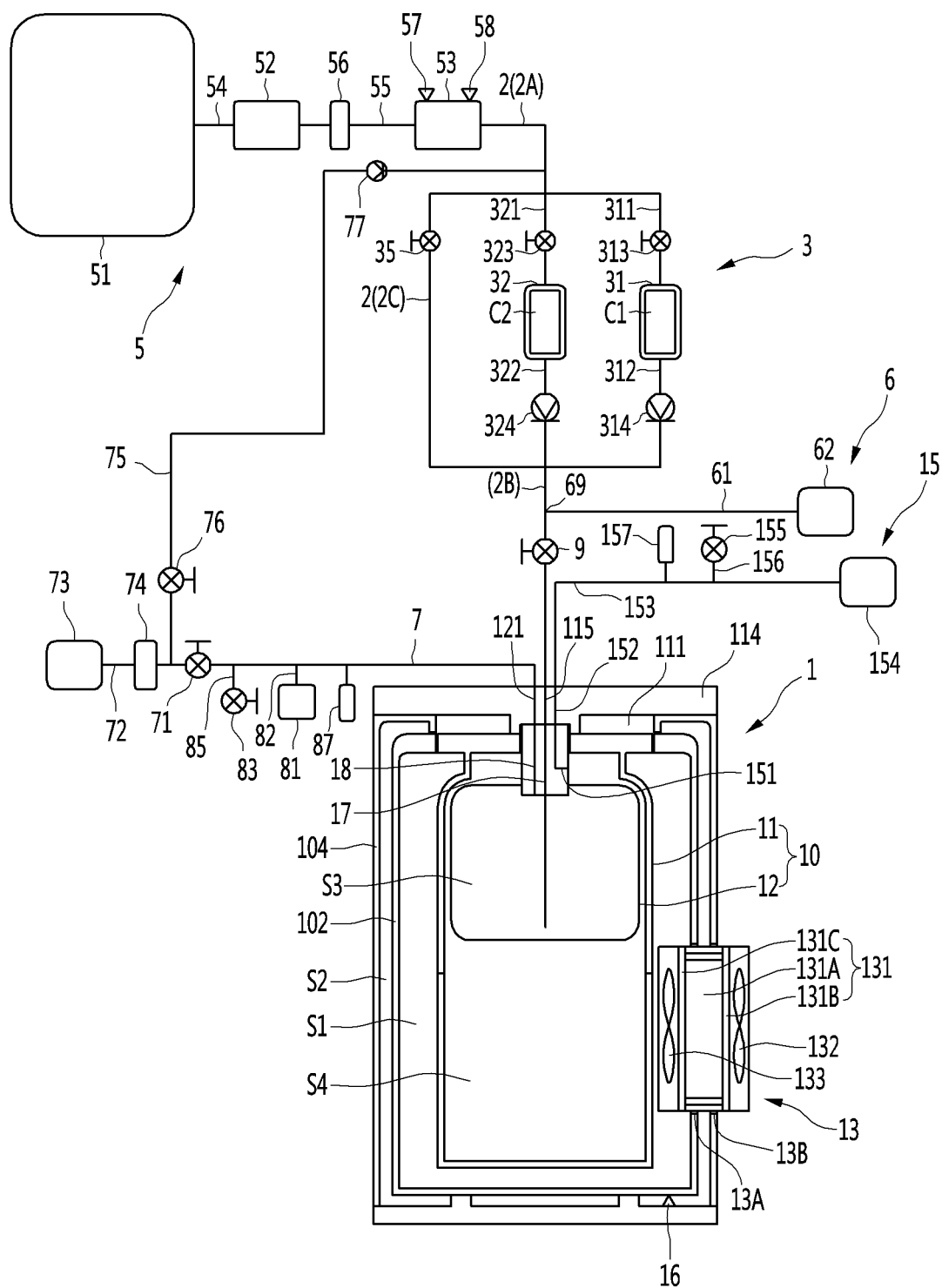
FIG. 16 is a view illustrating a configuration of a beer maker according to a third embodiment.
Figure 17:
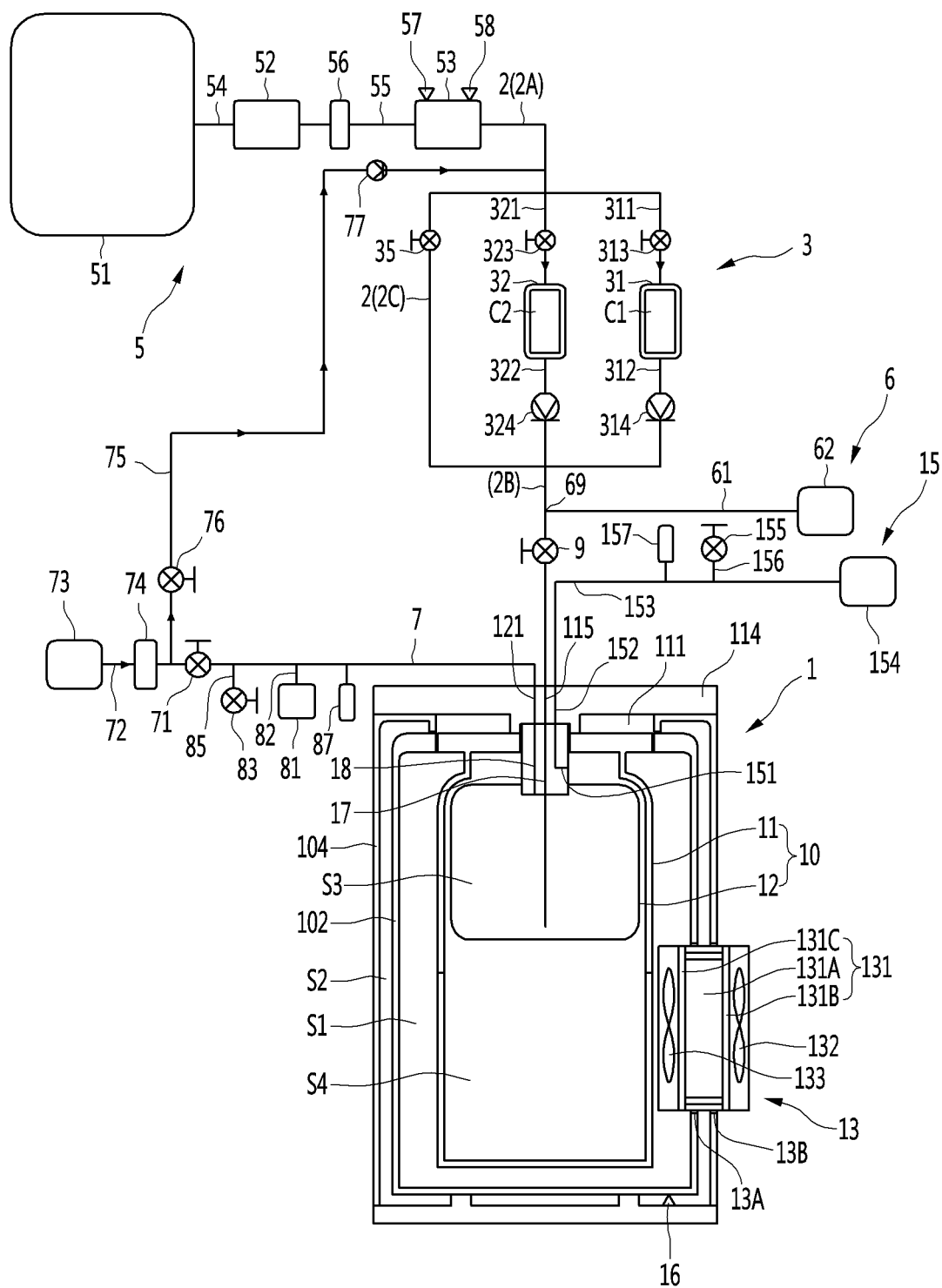
FIG. 17 is a view illustrating gas flow when a gas pump removes water of a dispenser according to the third embodiment.

FIG. 16 is a view illustrating a configuration of a beer maker according to a third embodiment. FIG. 17 is a view illustrating gas flow when a gas pump removes water of a dispenser according to the third embodiment. Other embodiments and configurations may also be provided.

The beer maker (of this embodiment) may include a connection channel 75 that connects the sub-channel and the ingredient supplying device 3 to each other. Additionally, the beer maker (of this embodiment) may include a connection channel valve 76 installed in the connection channel 75.

The connection channel 75 may be connected to the gas injection channel 72.

The connection channel 75 may be connected between the water supply module 5 and the ingredient supplying device 3 to supply gas to the ingredient supplying device 3.

In this embodiment, other components and operations except the connection channel 75 and the connection channel valve 76 are identical or similar to those of the first or second embodiment of the present disclosure. Therefore, the components are designated by like reference numerals, and their detailed descriptions may be omitted.

A check valve 77 that blocks water supplied from the water supply module 5 from being introduced into the gas injection channel 72 through the connection channel 75.

The connection channel 75 and the connection channel valve 76 may be provided to allow ingredients or water in the ingredient supplying device 3 to be flowed to the beer brewing space S3, and the gas pump 73 may be driven to allow ingredients or water in the ingredient supplying device 3 to be flowed to the outer main channel 2B.

The connection channel valve 76 may be generally maintained in the close state, and be opened only when ingredients or water of the beer maker is being supplied to the beer brewing space S3.

The beer maker may perform a supplying operation (or process) of supplying gas to the ingredient supplying device 3 when the additive inputting operations (S300 and S400) are performed or when the additive inputting operations (S300 and S400) are completed. After the supply of gas to the ingredient supplying device 3 is completed, the fermenting operations (S500 and S600) may be started.

In the supplying operation, the controller 109 may drive the gas pump 73, and open the connection channel valve 76. In this example, the ingredients or water in the ingredient supplying device 3 may flow to the outer main channel 2B by gas pumped by the gas pump 73.

When the connection channel valve 76 is opened, the controller 109 may allow the gas valve 71 to be maintained in the close state. When the connection channel valve 76 is opened, the controller 109 may open the first opening/closing valve 313 and the second opening/closing valve 323. When the connection channel valve 76 is opened, the controller 109 may open the main valve 9.

When the gas pump 73 is driven, gas may flow from the gas injection channel 72 to the connection channel 75. The gas of the connection channel 75 may flow to the first ingredient accommodating part 31 by passing through the first opening/closing valve 313. The gas may blow an ingredient or water in the first ingredient accommodating part 31 to the first ingredient supplying device exit channel 312. Additionally, the gas of the connection channel 75 may flow to the second ingredient accommodating part 32 by passing through the second opening/closing valve 323. The gas may blow an ingredient or water in the second ingredient accommodating part 32 to the second ingredient supplying device exit channel 322.

The ingredient or water of the first ingredient supplying device exit channel 312 and the ingredient or water of the second ingredient supplying device exit channel 322 may sequentially pass through the outer main channel 2B, the main valve 9, the body main channel 115, and the fermentation container main channel 17 and then be introduced into the beer brewing space S3.

The controller 109 may turn on the gas pump 73 for a gas supply set time. If the gas supply set time elapses, the controller 109 may turn off the gas pump 73, and turn off the first opening/closing valve 313, the second opening/closing valve 323, and the main valve 9.

If the gas supply set time elapses, the controller 109 may end the gas supplying process and then start the fermenting operations (S500 and S600).

In this embodiment, each of the gas valve 71 and the connection channel valve 76 may be configured as a separate opening/closing valve, and include one three-way valve capable of performing functions of the gas valve 71 and the connection channel valve 76. In this example, the three-way valve may include an entrance part connected to the gas injection channel 72, a first exit part connected to the outer sub-channel 7, and a second exit part connected to the connection channel 75.

In this embodiment, various types of channels including the supply channel 2A, the outer main channel 2B, the bypass channel 2C, the body main channel 115, the beer extraction channel 61, the outer sub-channel 7, the gas injection channel 72, the body sub-channel 121, the outer pressurization channel 153 or 153', the body pressurization channel 152, the connection channel 75, and the like may be formed as a hose or tube, or be configured with a plurality of hoses or a plurality of tubes, which are continued in the length direction. It will be apparent that the various types of channels may include at least two hoses and tubes disposed with another component such as a valve, a pump, a branch tube, or a paste tube, which is interposed therebetween.

Embodiments provide a beer maker in which ingredients for brewing beer and gas for assisting beer to be brewed are individually supplied to a beer brewing space, so that beer can be simply brewed.

Embodiments also provide a beer maker capable of minimizing a fermentation vessel or beer from being damaged.

Embodiments also provide a beer maker capable of minimizing a user from opening a lid.

In one embodiment, a beer maker includes: a body including a housing having a space formed therein and a lid opening/closing the space; a fermentation vessel accommodated in the space, the fermentation vessel having a beer brewing space formed therein; a main channel communicating with the beer brewing space, the main channel guiding ingredients for brewing beer; a sub-channel communicating with the beer brewing space, the sub-channel allowing gas to pass therethrough; a gas pump connected to the sub-channel to pump gas to the sub-channel; and a gas valve installed in the sub-channel.

The beer maker may further include a filter installed in the sub-channel to allow gas to pass therethrough.

The sub-channel may include a gas injection channel that connects the gas pump and the gas valve.

The sub-channel may include an outer sub-channel of which at least a portion is disposed at the outside of the body.

The gas valve may be connected to the outer sub-channel.

The beer maker may further include a pressure sensor connected to the outer sub-channel.

The beer maker may further include a gas discharge valve connected to the outer sub-channel to discharge gas of the outer sub-channel to the outside.

The gas discharge valve may be connected to the outer sub-channel through a gas discharge valve connection channel.

The sub-channel may further include a body sub-channel and a fermentation container sub-channel.

The body sub-channel may be formed in the body, and be connected to the outer sub-channel.

The fermentation container sub-channel may be formed in the fermentation vessel, and communicate with the beer brewing space and the body sub-channel.

The fermentation vessel may include: a beer extracting device connected to the main channel through a connection part; and a main valve installed between the body and the connection part in the main channel.

The beer maker may further include: an outer vessel accommodated in the space to be separated to the outside of the housing; and an inner vessel accommodated in the outer vessel, the inner vessel having the beer brewing space formed therein.

The beer maker may further include a pressurization channel connected between the outer vessel and the inner vessel.

The beer maker may further include a pressurizing pump disposed at the outside of the body, the pressurizing pump being connected to the pressurization channel.

The beer maker may further include a gas regulating valve connected to the pressurization channel to discharge gas of the pressurization channel.

The pressurization channel may include: a fermentation vessel pressurization channel communicating between the outer vessel and the inner vessel; a body pressurization channel formed in the body, the body pressurization channel communicating with the fermentation vessel pressurization channel; and an outer pressurization channel connecting the body pressurization channel and the pressurizing pump to each other.

The pressurization channel may be connected to the sub-channel. The pressurization channel may include: a fermentation vessel pressurization channel formed in the outer vessel, the fermentation vessel pressurization channel communicating between the outer vessel and the inner vessel; a body pressurization channel formed in the body, the body pressurization channel communicating with the fermentation vessel pressurization channel; and an outer pressurization channel connecting the body pressurization channel and the sub-channel to each other.

In another embodiment, a beer maker includes: a body including a housing having a space formed therein and a lid opening/closing the space; a fermentation vessel accommodated in the space, the fermentation vessel having a beer brewing space formed therein; an ingredient supplying device having an ingredient accommodating part formed therein, wherein ingredients for brewing beer are accommodated in the ingredient accommodating part; a main channel communicating with each of the ingredient supplying device and the beer brewing space, the main channel guiding the ingredients to the beer brewing space; a gas pump; a sub-channel connecting the gas pump and the inside of the body to each other; a gas valve installed in the sub-channel; and a connection channel connecting the sub-channel and the ingredient supplying device to each other.

The sub-channel may include: a gas injection channel connecting the gas pump and the gas valve to each other; and an outer sub-channel connected to the gas valve, the outer sub-channel having at least a portion disposed at the outside of the space.

The connection channel may be connected to the gas injection channel.

The beer maker may further include a connection channel valve installed in the connection channel.

According to the present disclosure, ingredients for brewing beer are supplied to the beer brewing space through the main channel, and gas are supplied to the beer brewing space through the sub-channel, so that beer can be simply brewed while minimizing a user from opening the lid.

Further, the fermentation vessel is protected by the body, so that the damage of the fermentation vessel can be minimized.

Further, at least a portion of the sub-channel may perform a function of supplying a gas to the beer brewing space and a function of discharging gas in the beer brewing space to the outside. Thus, the number of parts and ingredient cost can be minimized. Further, the structure of the beer maker can be simplified, and the beer maker can be manufactured compact in size.

Further, the gas pump injects gas into the beer brewing space or injects gas between the outer vessel and the inner vessel, so that the number of gas pumps can be minimized.

Further, the gas pump injects gas into the beer brewing space or injects gas into the ingredient supplying device, so that the number of gas pumps can be minimized.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A beer maker comprising:
a body including a housing having a space formed therein;
a fermentation container provided at the space, the fermentation container comprising a flexible container having a beer brewing space;
a lid connected to the housing to close the space;

a main channel that communicates with the beer brewing space, the main channel arranged to pass through the lid to guide ingredients for brewing beer to the beer brewing space;

a temperature regulating device provided to the body or the lid, the temperature regulating device to regulate a temperature of the fermentation container;

a sub-channel arranged to guide gas outside of the flexible container;

a gas pump, at the sub-channel, to pump gas, wherein the gas guided to the outside of the flexible container presses the flexible container in a state in which the lid is not opened, and beer in the beer brewing space is discharged to the main channel;

an ingredient supplying device connected to the main channel;

a beer extracting device coupled to the main channel by a connection part;

a main valve between the body and the connection part at the main channel; and a controller configured to selectively open and close the main valve;

wherein the controller is configured to open the main valve so that the ingredients from the ingredient supplying device are injected into the beer brewing space through the main channel, wherein the fermentation container is withdrawable from the space to outside of the body in a state in which the lid is opened.

2. The beer maker of claim 1, further comprising a filter, at the sub-channel, to allow gas to pass.

3. The beer maker of claim 1, further comprising a gas valve at the sub-channel, wherein the sub-channel includes a gas injection channel that couples the gas pump to the gas valve.

4. The beer maker of claim 1, wherein the sub-channel includes an outer sub-channel, wherein at least a portion of the outer sub-channel is outside of the body.

5. The beer maker of claim 4, comprising a pressure sensor coupled to the outer sub-channel.

6. The beer maker of claim 4, comprising a gas discharge valve to discharge gas from the outer sub-channel to outside of the body.

7. The beer maker of claim 6, wherein the gas discharge valve is coupled to the outer sub-channel by a gas discharge valve connection channel.

8. The beer maker of claim 4, wherein the sub-channel includes:

a body sub-channel coupled to the outer sub-channel, the body sub-channel being at the housing or the lid; and a fermentation container sub-channel at the fermentation container, the fermentation container sub-channel for communicating with the beer brewing space and the body sub-channel.

9. The beer maker of claim 1, wherein the fermentation container includes:

an outer vessel in the space, wherein the flexible container is provided in the outer vessel.

10. The beer maker of claim 9, wherein the sub-channel extends between the outer vessel and the flexible container.

11. The beer maker of claim 1, wherein the gas pump is provided outside of the body.

12. The beer maker of claim 10, wherein a pressurization channel is coupled to the sub-channel, and wherein the pressurization channel includes:

a fermentation vessel pressurization channel at the outer vessel, the fermentation vessel pressurization channel for communicating between the outer vessel and the flexible container;

a body pressurization channel at the body, the body pressurization channel for communicating with the fermentation vessel pressurization channel; and an outer pressurization channel to couple the body pressurization channel to the sub-channel.

* * * * *